US012591668B1

(12) United States Patent
Lindsey et al.

(10) Patent No.: US 12,591,668 B1
(45) Date of Patent: Mar. 31, 2026

(54) ADAPTIVE AUTHENTICATION FOR RANSOMWARE INTERVENTION

(71) Applicant: Halcyon Tech, Inc., Austin, TX (US)

(72) Inventors: Clark Lindsey, Loudon, TN (US);
Ryan Smith, Austin, TX (US); Robert Bushner, Homeland, CA (US);
Alexander Lazar, Santa Monica, CA (US); Kristen Lamb, Austin, TX (US);
Seagen Levites, Oregon City, OR (US);
Jonathan Miller, Poway, CA (US);
Peter Morgan, Scottsdale, AZ (US);
Michael Mullin, Kanata (CA); Paul Vincent Sabanal, Quezon City (PH);
Timothy West, Prosper, TX (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

(21) Appl. No.: 19/303,212

(22) Filed: Aug. 18, 2025

(51) Int. Cl.
| | |
|---|---|
| *H04L 29/06* | (2006.01) |
| *G06F 21/54* | (2013.01) |
| *G06F 21/55* | (2013.01) |
| *G06F 21/57* | (2013.01) |

(52) U.S. Cl.
CPC ............ *G06F 21/554* (2013.01); *G06F 21/54* (2013.01); *G06F 21/577* (2013.01)

(58) Field of Classification Search
CPC ....... G06F 21/554; G06F 21/54; G06F 21/577
See application file for complete search history.

(56) References Cited

U.S. PATENT DOCUMENTS

| | | | | |
|---|---|---|---|---|
| 9,092,782 | B1* | 7/2015 | Zaslavsky | G06F 21/577 |
| 9,348,981 | B1* | 5/2016 | Hearn | H04L 9/3271 |
| 12,244,635 | B1* | 3/2025 | Bonfield | H04L 63/1433 |
| 12,367,424 | B1* | 7/2025 | Gdula | H04L 63/1416 |
| 2016/0226905 | A1* | 8/2016 | Baikalov | H04L 63/1433 |
| 2018/0046796 | A1* | 2/2018 | Wright | G06F 21/45 |
| 2019/0138727 | A1* | 5/2019 | Dontov | G06F 11/1464 |
| 2021/0120010 | A1* | 4/2021 | Chen | H04L 67/145 |
| 2021/0157913 | A1* | 5/2021 | Fralick | H04L 63/145 |
| 2022/0343017 | A1* | 10/2022 | Wang | H04L 9/3234 |
| 2023/0199017 | A1* | 6/2023 | Chacko | H04L 63/1441 |
| | | | | 726/22 |
| 2024/0143781 | A1* | 5/2024 | Bubshait | G06F 21/577 |

(Continued)

OTHER PUBLICATIONS

Jun Tang, The Proactive Approach to Cyber-Attack Prevention: Countermeasures Against Ransomware, Nov. 12, 2024, IEEE, pp. 376-379. (Year: 2024).*

(Continued)

*Primary Examiner* — Luu T Pham
*Assistant Examiner* — Fahimeh Mohammadi
(74) *Attorney, Agent, or Firm* — Jones Day

(57) ABSTRACT

Security in a computing environment is enhanced by analyzing telemetry data from an agent on a device, along with user integrity information, to detect events that suggest compromised credentials. When such an event is detected, a risk level is assigned based on the analysis. This risk level is then correlated with a corresponding authentication difficulty level, which specifies the types and strengths of authentication mechanisms to be used. The selected authentication difficulty level is applied across multiple devices within the environment, enabling adaptive and dynamic protection against unauthorized access due to compromised credentials.

30 Claims, 17 Drawing Sheets

(56) References Cited

U.S. PATENT DOCUMENTS

| | | | |
|---|---|---|---|
| 2024/0284800 A1* | 8/2024 | Lee | H10N 10/17 |
| 2025/0088520 A1* | 3/2025 | Gerow | H04L 63/1416 |
| 2025/0254318 A1* | 8/2025 | Sasano | G08G 1/04 |
| 2025/0258928 A1* | 8/2025 | Thompson | G06F 21/577 |

OTHER PUBLICATIONS

Claudy Picard et al., RLAuth: A Risk-Based Authentication System Using Reinforcement Learning, Jun. 14, 2023, vol. 11, pp. 61129-61143. (Year: 2023).*
Arunan Sivanathan et al., Managing IoT Cyber-Security Using Programmable Telemetry and Machine Learning, Mar. 2020, IEEE, vol. 17, Issue: 1, pp. 60-74. (Year: 2020).*
Aleksandra Nenadic et al., Levels of Authentication Assurance: an Investigation, Sep. 10, 2007, IEEE, pp. 155-158. (Year: 2007).*

* cited by examiner

1700

1710 — Identify Event Indicative of Compromised Credentials

1720 — Determine Risk Level for Event

1730 — Map Risk Level to Authentication Difficulty Level

1740 — Enforce Authentication Difficulty Level Across Computing Device(s)

ADAPTIVE AUTHENTICATION FOR RANSOMWARE INTERVENTION

TECHNICAL FIELD

The subject matter described herein relates to techniques for thwarting ransomware attacks through adaptive authentication requirements for populations of users within a monitored computing environment.

BACKGROUND

Ransomware attacks have evolved into highly sophisticated threats that exploit vulnerabilities within targeted applications to infiltrate systems, exfiltrate sensitive information, and encrypt critical files. These attacks often leverage advanced encryption algorithms and automated tools to maximize operational disruption and exert significant pressure on victims to pay a ransom. Modern ransomware is capable of targeted exploitation, moving laterally within an application's environment, and intelligently identifying and prioritizing high-value data for encryption. Rapid detection and response to these malicious activities are essential for effectively countering ransomware threats, making the ability to make timely, localized security decisions within the environment increasingly important.

In addition, when legitimate users attempt to access a system, they are typically required to authenticate using a fixed set of factors. This authentication process can involve verifying a password, one-time token, smart card, third-party token, or similar credentials. While such measures can enhance security by making it more challenging for attackers to impersonate authorized users, they can also introduce friction for legitimate users, potentially hindering their ability to access necessary resources and impacting overall system efficiency and user experience.

SUMMARY

In a first aspect, a process is provided for securing a computing environment from unauthorized access, implemented by one or more computing devices. This process utilizes both telemetry data generated by an agent executing on a monitored computing device and user integrity information to identify events that can indicate compromised credentials. Telemetry data can include captured login timestamps, counts of failed login attempts, login locations, network folder access requests, network file enumeration requests, privileged process access requests, process security context, and modifications to system settings. User integrity information can encompass user identification details, group or membership affiliations, login history, password attempt records, user rights specifying authorized actions, and local security authority settings.

Upon identifying an event indicative of compromised credentials, the process determines a risk level for the event. This risk level is then mapped to an authentication difficulty level, which specifies the types and strengths of authentication mechanisms to be implemented. For example, higher risk levels can require multi-factor authentication or additional verification steps, while lower risk levels can only require standard password entry. The selected authentication difficulty level is enforced across one or more computing devices within the environment, thereby restricting access to sensitive resources based on the assessed risk.

The process can further include terminating any active sessions and processes associated with the compromised credentials to prevent further unauthorized access or malicious activity. If the compromised credentials are subsequently used after the enforcement of the heightened authentication difficulty level, an alert can be generated to notify administrators or security personnel of the continued risk.

The agent can initiate an integrity protection information sequence to obtain comprehensive user integrity information for each user in the environment. This sequence can involve collecting user identification, group memberships, login and password attempt history, user rights, and local security authority settings. The identification of compromised credentials can be performed locally by the agent on the computing device for rapid response, or the agent can transmit telemetry data and user integrity information to a remote monitoring platform for analysis. The remote platform can notify the agent if compromised credentials are detected.

In scenarios involving ransomware attacks, the remote monitoring platform can determine which ransomware tools are being utilized, examine configuration data associated with these tools, and extract any compromised credentials being exploited. The enforced authentication difficulty level is then applied to accounts associated with these credentials, providing additional protection against ongoing attacks.

By continuously monitoring user activity and system state, assessing risk, and dynamically adjusting authentication requirements, the process mitigates the risk of unauthorized access due to compromised credentials. The ability to terminate sessions and processes, generate alerts, and adapt to evolving threats such as ransomware enhances the overall security of the computing environment.

In an interrelated aspect, a computing environment is secured from unauthorized access by identifying, based on (i) telemetry data generated by an agent executing on a monitored computing device and (ii) user integrity information, an event indicative of compromised credentials. Thereafter, a risk level for the event is determined based on the identifying. The risk level is then mapped to an authentication difficulty level which specifying types of authentication mechanisms to implement for the level (such that higher levels require more burdensome authentication techniques, etc.). Thereafter, the authentication difficulty level is enforced across one or more computing devices within the computing environment. In some cases, the authentication difficultly level is enforced across all applications associated with a specific user. In other case, the authentication difficulty level is enforced for a group of associated users (e.g., users associated with a particular tenant, users associated with a particular computing environment, users associated with a particular access control level, etc.).

In a further interrelated aspect, a computing environment is secured from unauthorized access by identifying, based on telemetry data generated by an agent executing on a monitored computing device and user integrity information, an event indicative of compromised credentials. The agent then transmits information characterizing the event to a remote ransomware monitoring platform. The agent later receives, from the ransomware monitoring platform, a risk level of the event indicative of compromised credentials. This risk level is mapped by the agent to an authentication difficulty level which specifies types of authentication mechanisms to implement. The agent then enforces the authentication difficulty level across one or more computing devices within the computing environment to counter the event indicative of compromised credentials.

In a further interrelated aspect, a computing environment is secured from unauthorized access by identifying, based on telemetry data generated by an agent executing on a monitored computing device indicative of ransomware and user integrity information, an event indicative of compromised credentials. An authentication difficulty level is then adaptive elevated in order to counter the event indicative of compromised credentials. This authentication difficulty level is then enforced across one or more computing devices within the computing environment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. In particular, the current techniques provide a comprehensive and adaptive approach to authentication in environments vulnerable to ransomware attacks. By leveraging endpoint telemetry, dynamic risk assessment, and dual-mode intervention (automated and manual), the system significantly enhances network security while maintaining usability. The current techniques also, of note, provide a scalable, cost-effective, and robust solution suitable for deployment in various cybersecurity applications.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to techniques for thwarting ransomware and other malicious attacks through adaptive authentication mechanisms.

The current subject matter leverages various telemetry elements on the endpoint including: intra-process and inter-process behavior, static analysis of machine instructions, and authentication anomalies combined with higher-level telemetry such as patterns among endpoints, and telemetry from network devices in order to determine the likelihood that an attack is taking place. Based on the perceived likelihood that an attack is taking place, the difficulty of authentication across a large population of users can be implemented by requiring additional authenticating factors all the way to denying access entirely based on a username, channel that is being authorized, or a specific set of systems.

Figure 1:
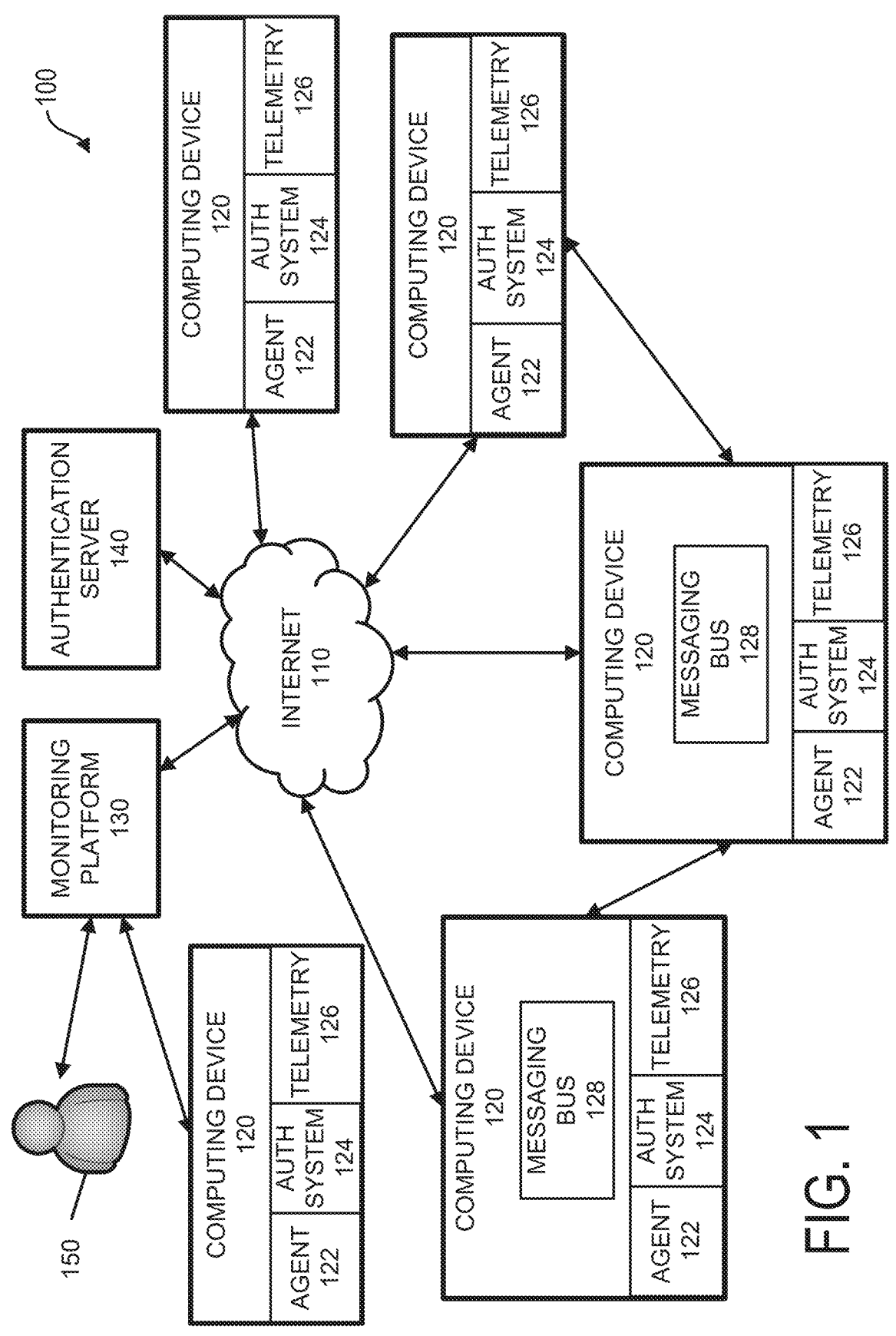
FIG. 1 is an architecture diagram illustrating aspects of a security monitoring platform in which agents are installed on computing devices.
Figure 2:
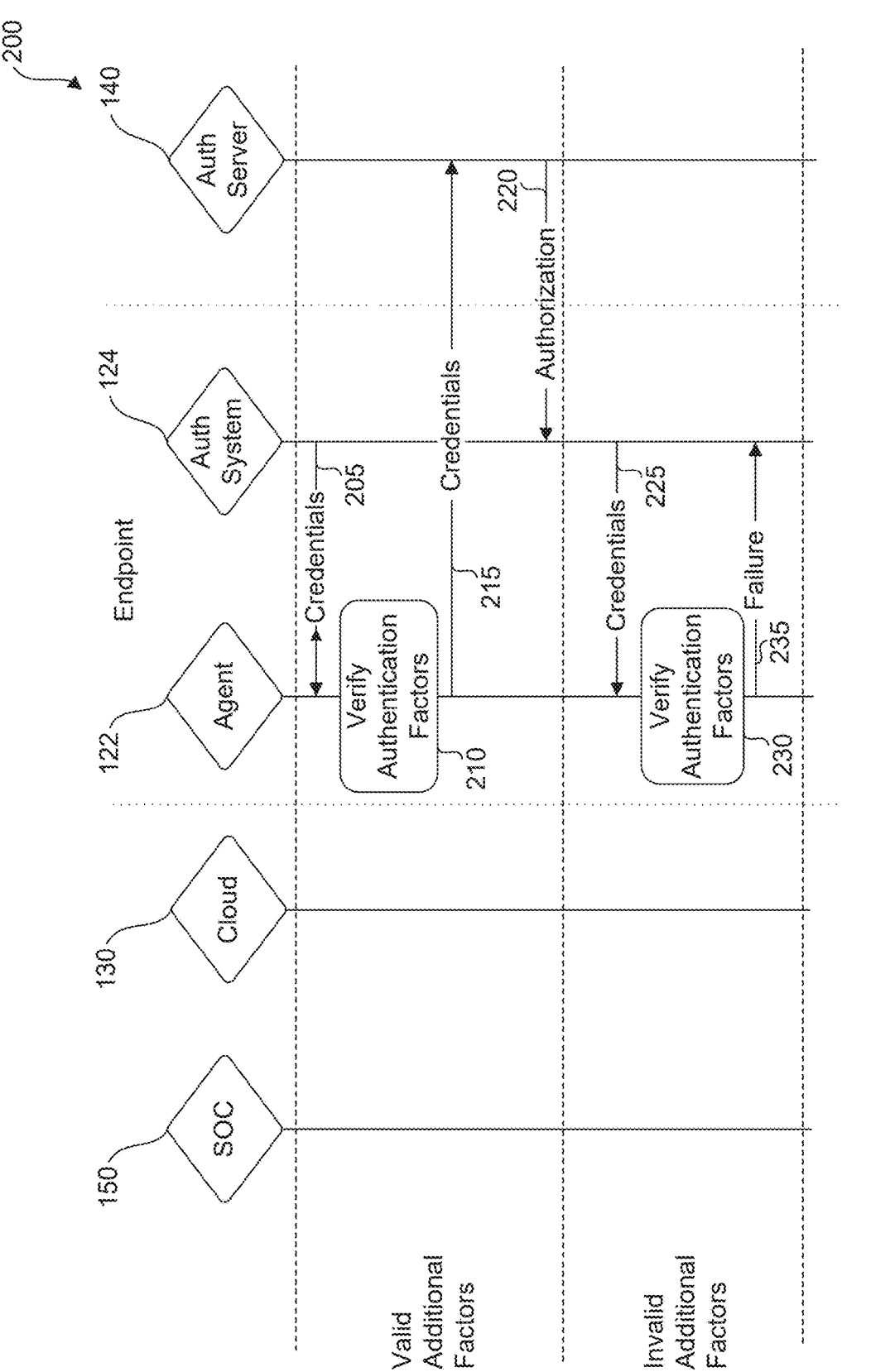
FIG. 2 is a first diagram illustrating an authentication workflow.

FIG. 1 is an architecture diagram 100 in which a monitoring platform 130 can monitor and protect a plurality of computing devices 120 (e.g., endpoints, etc.) by way of the Internet 110 or by way of direct connections (e.g., on-premise protection, etc.). Each of the monitored computing device 120 can include or otherwise execute at least one agent 122 which can execute or interface with an authentication system 124 and one or more telemetry components 126. The monitoring platform 130 can communicate with one or more users forming part of a Security Operations Center (SOC) 150 such as ransomware detection and response teams which can initiate one or more authentication processes in order to thwart a ransomware attack.

The authentication system 124 is a local application and/or process to selectively provide access to resources when a user is authenticated. The authentication system 124 can execute local authentication measures and/or it can interface with a remote authentication server 140.

The telemetry components 126 can be executed on the computing device and can individually or in combination be used to locally analyze security events and/or to transmit data to the monitoring platform 130 (i.e., cloud-based platform, etc.) which characterize security events. In some cases, the telemetry component 126 solely works locally while, in other variations, the telemetry component 126 works in coordination with the monitoring platform 130. The computing environment can also include an authentication platform 140 which can be accessed via an API to provide authentication services to applications and processes on the various computing devices 120. The authentication platform 140 can also interface or otherwise consume information generated by the telemetry component

126. In some cases, some or all of the functionality of the monitoring platform 130 can be performed, for example, locally on the computing device 120 (e.g., by the agent 122 and/or the telemetry component 126). Similarly, in some cases, some or all of the functionality of the authentication platform 140 can be performed, for example, locally on the computing device 120 (e.g., by the agent 122 and/or the telemetry component 126). In some cases, the authentication platform 140 can implement more secure authentication techniques when a ransomware attack is suspected or had otherwise commenced. When the authentication platform 140 acts as a service, the authentication techniques for particular applications, processes, and/or computing devices 120 can be dynamically adjusted on such authentication platform 140. In addition or in the alternative, the authentication platform 140 can send commands/signals to the various computing devices 120 which result in the particular authentication scheme used at the computing device 120 to be accordingly modified.

In some cases, the computing device 120 can execute a messaging bus 128 which selectively processes and transmits messages characterizing security events. The messaging bus 128 can generate, process, and transmit messages that are derived from security events generated or identified by the agent 122 or the telemetry component 126 and/or from other sources executing on the corresponding computing device 120 or a peer computing device 120. Further details regarding the messaging bus 128 can be found in U.S. Pat. No. 12,130,914, the contents of which are hereby fully incorporated by reference. In some cases, the computing device 120 can also execute a kernel model such as described in U.S. patent application Ser. No. 19/084,548 filed on Mar. 19, 2025, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No.

18/948,343 filed on Nov. 14, 2024, the contents of which are hereby fully incorporated by reference.

The monitoring platform 130 can take telemetry data from the telemetry components 126 on the computing devices 120 (i.e., endpoints, etc.) and use individual endpoint telemetry data and telemetry from a plurality of endpoints, determines the current likelihood that a ransomware or other malicious attack is underway by deriving a risk level. The telemetry components 126 can, by way of the respective messaging buses 128, individually transmit data characterizing information such as intra-process and inter-process behavior, static analysis of machine instructions, and authentication anomalies. The telemetry components 126 can, for example, capture information such as login timestamps, login failure counts, login locations, network folder access requests, network file enumeration requests, privileged processes access requests, process security context, modifications to system settings, and the like. This information can be aggregated by the monitoring platform 130 across multiple computing devices 120 to provide higher level computing environment telemetry such as patterns among computing device 120, and telemetry from network devices in order to determine the likelihood that an attack is taking place.

Based on the risk level, an enforcement component executed on or in connection with the monitoring platform 130 can determine a level of authentication to enforce across a population of users. This level can, for example, be one-factor such as a password if there currently is no risk. The level of authentication can be three-factor if there is a high level of risk. In some variations, the authentication platform 140 does not allow access to users on any of the computing devices 120 if an attack is clearly taking place with the credentials.

In some cases, the authentication platform 140 implements a Pluggable Authentication Module (PAM) framework. PAM is a framework that allows applications executing on the computing devices 120 that need to perform authentication to do so in a generic manner, with the exact implementation up to third party modules. With the current subject matter, a PAM module can be installed that would look at authentications on a computing device 120. The PAM module can provide information to the authentication platform 140 regarding the user that is being authenticated, the service to which authentication is being attempted, the type of authentication being attempted (such as certificate), whether an entered password appears to be of a composition that may indicate a brute force attempt, and the realm (i.e., security policy domain, etc.) from which the user originates. This information can then be sent to the monitoring platform 130 which would derive a risk level.

Many ransomware attacks utilize compromised service accounts in order to proliferate across systems within a network. These service accounts are local to specific computing devices 120 and can provide access to administrators if the Domain or LDAP authentication systems are unreachable, and provide access to applications that may require an account. A Service Account Detection Component executing on the monitoring platform 130 can pattern match incoming telemetry from a plurality of telemetry components 126 across different computing devices 120 to determine whether the use of such service accounts matched patterns of ransomware compromise. This determination may be from the perspective of a single computing device 120 or across the perspective of a plurality of computing devices 120. In some cases, various other rules/heuristics can be used to determine whether the telemetry information is indicative of ransomware. Still further, in some cases, one or more machine learning models can be used to analyze features extracted or otherwise derived from the telemetry information.

During a brute force attempt, a threat actor will attempt a list of common passwords to see if they result in successful authentication. If a brute force attempt is detected by a detection component, then the authentication platform 140 can be directed to fail the first X good authentication attempts on a system/application. This effectively breaks brute force logic as implemented in current attack tools which iterate through different passwords once they are rejected. Additionally, the authentication platform 140 can require a successful brute force algorithm to try every password X+1 times, and if the authentication platform 140 detects a repetition of Y for passwords, it could simply move X to Y+1.

In some variations, the monitoring platform 130 continuously monitors network events and endpoint behaviors for signs of a ransomware attack. When ransomware indicators are detected, the monitoring platform 130 can leverage preconfigured knowledge of common ransomware tool structures and signatures to analyze the tools deployed by the attacker. Specifically, the monitoring platform 130 can examine the configuration data within these tools to extract any compromised credentials that are being utilized. The configuration data can be stored in the executable file image. The location of the configuration data can vary from ransomware family to ransomware family and be stored as a resource in the PE file's '.rsrc' section or in the read-only initialized data, '.rdata', section of the PE file.

Once the monitoring platform 130 identifies and extracts the compromised credentials, it can automatically initiate an escalation protocol via the authentication platform 140 (which can be characterized as a centralized cloud management system). This protocol can immediately disable the affected accounts across all computing devices 120 and, for example, enforce a token-based multi-factor authentication requirement for any subsequent administrative access attempts. By automatically disabling these credentials, the monitoring platform 130 effectively prevents the attacker from leveraging them for lateral movement within the network (i.e., the monitored computing environment, etc.).

The monitoring platform 130 automatically or in combination with a security team can deploy a multi-faceted approach to detecting compromised credentials during a ransomware incident, leveraging information from various sources. The monitoring platform 130 can received third party notifications from remote sources. These notifications can comprise alerts from trusted external threat intelligence providers indicating that a specific ransomware variant is targeting similar organizations. These notifications can include details characterizing common tactics, techniques, and procedures (TTPs) used by the attackers, providing an early warning that certain credential types may be at risk so that thresholds to escalate authentication can be accordingly modified.

The monitoring platform 130 can include or otherwise implemented automated security monitoring systems to detect anomalous activity. Anomalous activity detected by the monitoring platform 130 can include abnormal authentication patterns—such as spikes in failed login attempts, access requests from unusual geographic locations, and irregular use of administrative credentials-which trigger internal alerts for further investigation or for changing thresholds to escalate authentication.

The monitoring platform 130 can continuously reviews network logs to identify suspicious behaviors. Unusual patterns such as unexpected network traffic to critical endpoints, lateral movement between systems, and atypical data flows can be flagged. Such insights can be used by the monitoring platform 130 to pinpoint areas where compromised credentials might be in use.

The monitoring platform 130 can also be used to analyze authentication records. The monitoring platform 130 can identify or otherwise observe deviations from normal access behavior, including out-of-hours login attempts and authentication requests from IP addresses that do not typically interact with the network. These patterns serve as additional indicators that credentials may have been misappropriated so that threat levels and/or authentication techniques can be adjusted.

Based on these diverse inputs from the monitoring platform 130, a security team initiates a detailed forensic investigation. Using established forensic techniques, a security team can manually analyze the ransomware attacker's tools and configurations. Such an investigation can reveals that these tools embed compromised credentials-information that confirms the alerts from automated systems and external sources. Once the compromised credentials are identified and verified, the security team can use a centralized administrative graphical user interface to enter instructions to trigger a lockout procedure. This procedure can disable the affected accounts across all computing devices 120 and can, for example, enforce a token-based multi-factor authentication requirement for any subsequent administrative access attempts. By doing so, the security team prevents the attacker from leveraging these credentials to move laterally through the network, thereby containing the ransomware spread.

In some variations, the agents 122 deployed across computing devices 120 forming the network continuously monitor every authentication attempt. These agents 122 and/or the telemetry components 126 can capture detailed telemetry-including timestamps, user behavior, geographic origins, and process-level data during authentication—that feeds into a broader analysis framework leveraged by the monitoring platform 130. Such telemetry data can be integrated by the monitoring platform 130 with other data (such as intra-process and inter-process behavior) to determine a real-time risk level for the network.

In some variations, based on this risk assessment, the system operates in two modes: automated response or manual oversight.

Automated Response. When the telemetry data indicate suspicious authentication patterns-such as unusual login times, rapid successive attempts, or anomalies that deviate from established baselines—the monitoring platform 130 can calculate an elevated risk level. In response, the intervention components in communication with or forming part of the authentication platform 140 (for example, a PAM module integrated into the authentication process) can automatically escalate security requirements. This escalation can involve enforcing a token-based multi-factor authentication (MFA) requirement or, in cases of critical risk, temporarily denying authentication for the affected account. Such measures can hinder a malicious actor's ability to exploit compromised credentials and move laterally within the network.

The monitoring platform 130 and/or agent 122 can continuously monitors network activity for specific signals indicative of a potential ransomware attack-such as anomalous initial access events or network enumeration-which may suggest that administrative credentials have been compromised. Upon detecting these signals, the monitoring platform 130 can escalate authentication requirements across all endpoint devices. Specifically, the monitoring platform 130 can issue a directive that mandates users (e.g., users with administrative privileges, etc.) to use a more difficult/safe authentication mechanism (e.g., authenticate using a token-based method in addition to their standard credentials, etc.). As a result, endpoints can automatically deny administrative access unless a valid token is presented. This escalated authentication requirement deviates from the typical process, thereby impeding an attacker's ability to leverage stolen credentials for lateral movement throughout the network.

By forcing this additional verification step, the system frustrates the adversary's efforts, effectively slowing down the ransomware's propagation. This delay provides the security team 150 with crucial extra time to detect, isolate, and remove the threat, ultimately reducing the number of systems that could be compromised or encrypted.

Manual Oversight. Simultaneously, comprehensive logs and real-time alerts from the endpoint agents are forwarded to the security operations team. Analysts can review the detailed authentication telemetry and verify anomalies. When manual intervention is warranted, security personnel use a centralized administrative interface to either further escalate authentication requirements or to lock out an account entirely. This manual control allows for context-specific decisions that complement or override the automated system based on a thorough forensic review.

By leveraging the ability of the agents 122 and telemetry components 126 to continuously monitor authentication events and combining both automated analytics with manual oversight, the system can dynamically adjust the authentication difficulty in response to evolving threat levels.

In addition to the automated escalation of authentication requirements, the system can provide for manual authentication escalation by the SOC 150 or other threat response personnel. For example, security personnel actively monitor network activity for signs of a potential ransomware attack—such as unusual initial access patterns or extensive network enumeration—that may indicate compromised administrative credentials. Upon detecting and verifying these indicators, the security team manually can initiate an escalation protocol via a centralized administrative interface.

Using this interface, security personnel 150 can issue a command to the monitoring platform 130, instructing all endpoints 120 to enforce an enhanced, token-based multi-factor authentication process for users with administrative privileges. Consequently, endpoints automatically deny administrative access if a valid token is not presented. This manual escalation disrupts an attacker's ability to leverage stolen credentials for lateral movement within the network. By manually triggering this heightened authentication requirement, the security team can delay the attack's progress, allowing additional time to identify, isolate, and remediate the threat-thereby minimizing the overall impact of the ransomware attack.

FIGS. 2-6 are diagrams illustrating various authentication workflows that can be implemented using a system such as illustrated in FIG. 1. These workflows can involve one or more of a user 150 (which can, for example, be an internal security team, etc.), a cloud-based monitoring platform such as monitoring platform 130, an agent 122 which can be implemented on a monitored endpoint (such as computing device 120), an authentication system 124 on the monitored endpoint, and an authentication server 140. With reference to diagram 200 of FIG. 2, at 205, the authentication system 124 transmits received credentials to the agent 122. The agent 122 then, at 210, verifies the authentication factors, and if they are valid, the credentials are passed, at 215, to the authentication server 140. In response, at 220, the authentication server 124 transmits an affirmative authorization to the authentication system 124 to enable the associated application or process corresponding to the authentication request to execute on the computing device 130. In another workflow, at 225, the authentication system 124 sends credentials to the agent 122 which are verified, at 230, using a plurality of authentication factors. In this case, the verification fails so the agent, at 235, sends a failure notification to the authentication system 124 to prevent the associated application or process corresponding to the authentication request from executing.

Figure 3:
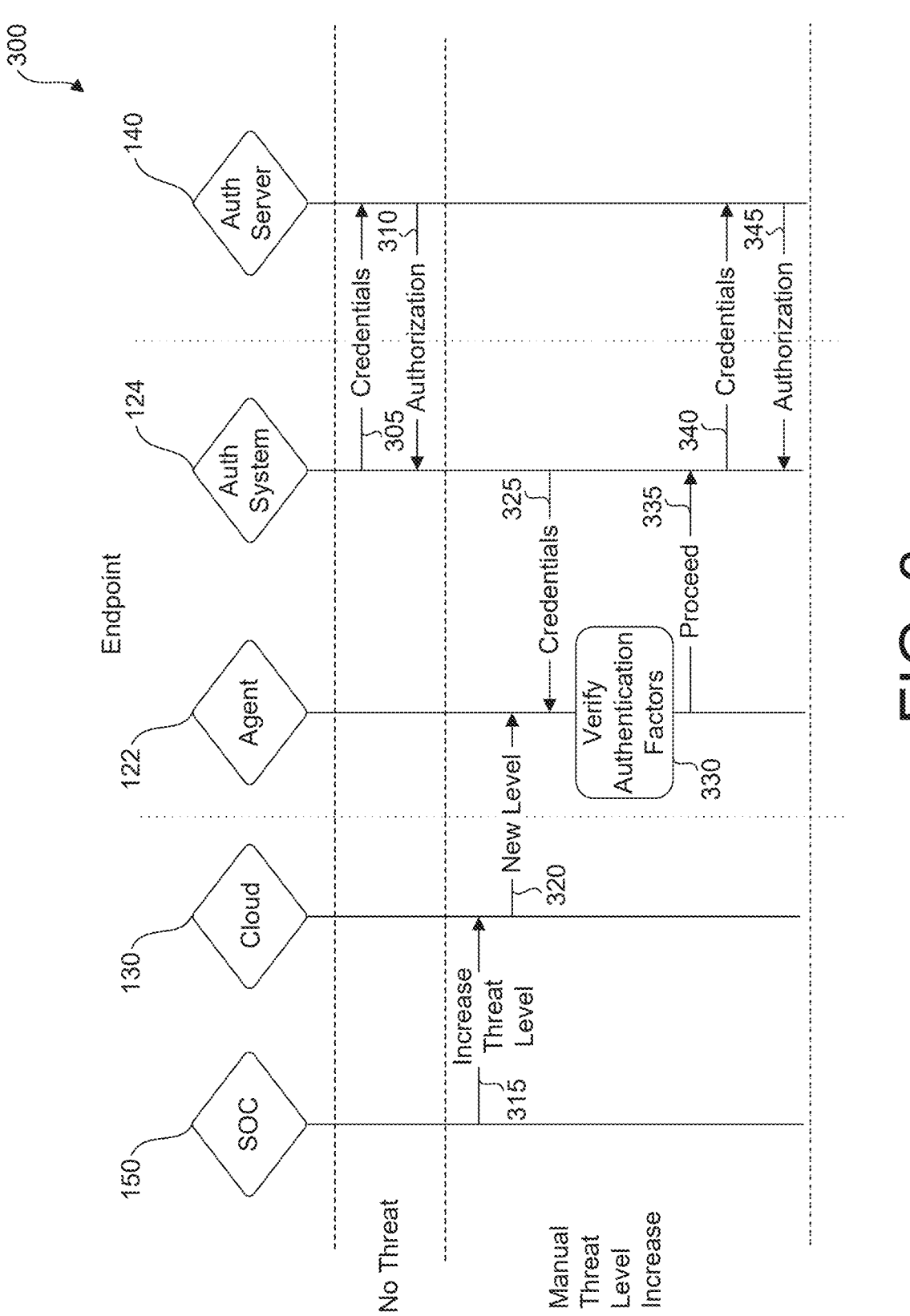
FIG. 3 is a second diagram illustrating an authentication workflow.

FIG. 3 is a diagram 300 in which, at 305, the authentication system 124 sends credentials to the authentication server 140 which returns, at 310, an authorization to the authentication system 124 which then allows the computing device 120 to execute a corresponding application or process (as there is no threat). In a different workflow, the SOC 150 can initiate, at 315, an increase in the threat level by way of the monitoring platform 130. The monitoring platform 130, at 320, pushes the increased threat level to the agent. Later, the authentication system 124, at 325, sends new credentials to the agent 122. The agent 122, then, at 330, verifies whether the local authentication factors have been met (which were made more onerous/difficult as a result of the pushed new threat level). A positive determination in this regard results, at 335, with the agent 122, sending an indication, at 335, to the authentication system 124 to proceed. The authentication system 124 then, at 340, passes the credentials to the authentication server 140 for authorization at 345.

Figure 4:
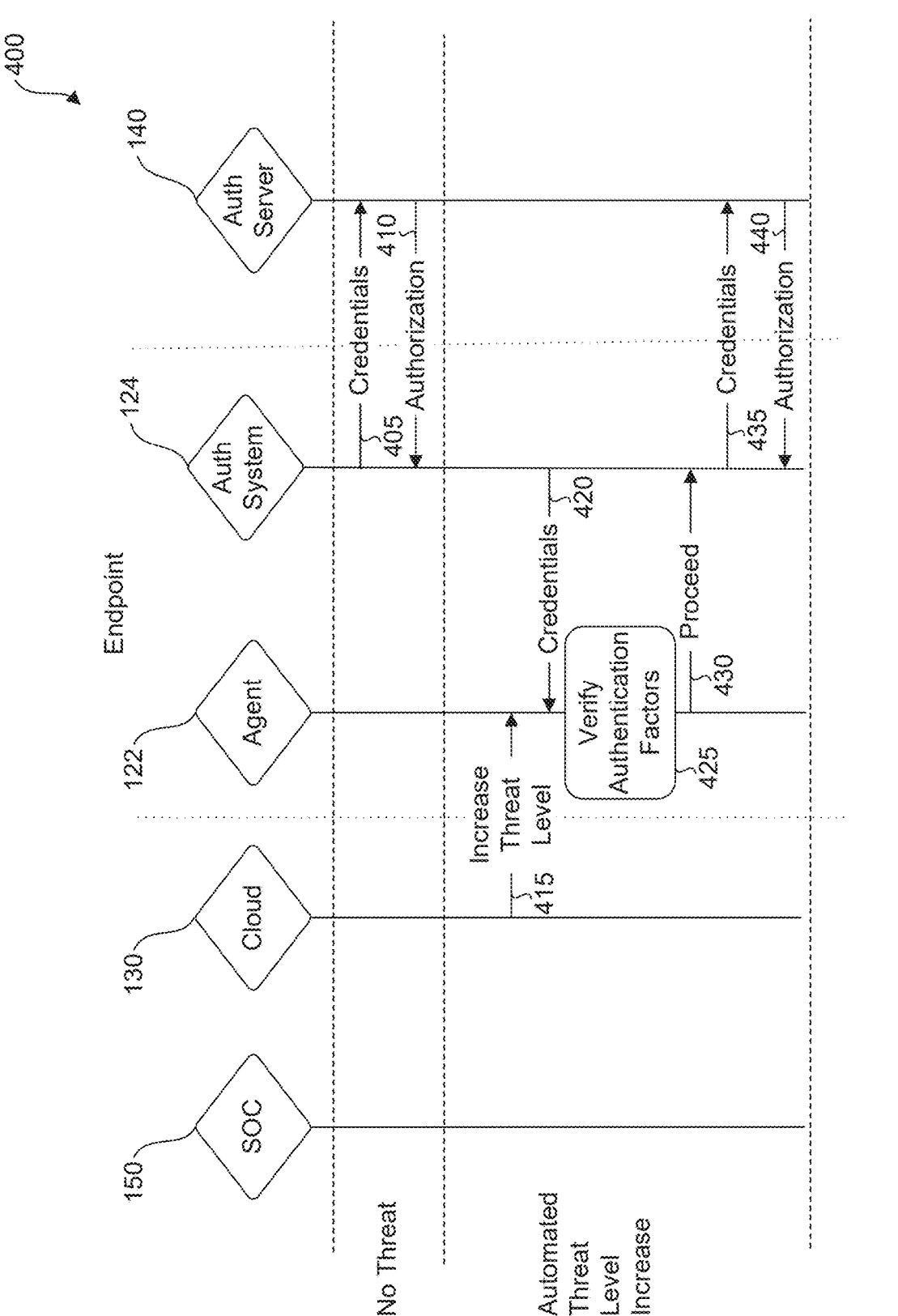
FIG. 4 is a third diagram illustrating an authentication workflow.

FIG. 4 is a diagram 400 which is a variation of the workflow in FIG. 3 in which the monitoring platform 130 automatically increases the threat level. The authentication system 124, at 405, sends credentials to the authentication server 140 which returns, at 410, an authorization to the authentication system 124 which then allows the computing device 120 to execute a corresponding application or process (as there is no threat). In a different workflow, the cloud 130 can initiate, at 415, an increase in the threat level by way of the monitoring platform 130. Later, the authentication system 124, at 420, sends new credentials to the agent 122. The agent 122 then, at 425, verifies whether the local authentication factors have been met (which were made more onerous/difficult as a result of the pushed new threat level). A positive determination in this regard results in the agent 122, sending an indication, at 430, to the authentication system 124 to proceed. The authentication system 124 then, at 435, passes the credentials to the authentication server 140 for authorization at 440.

Figure 5:
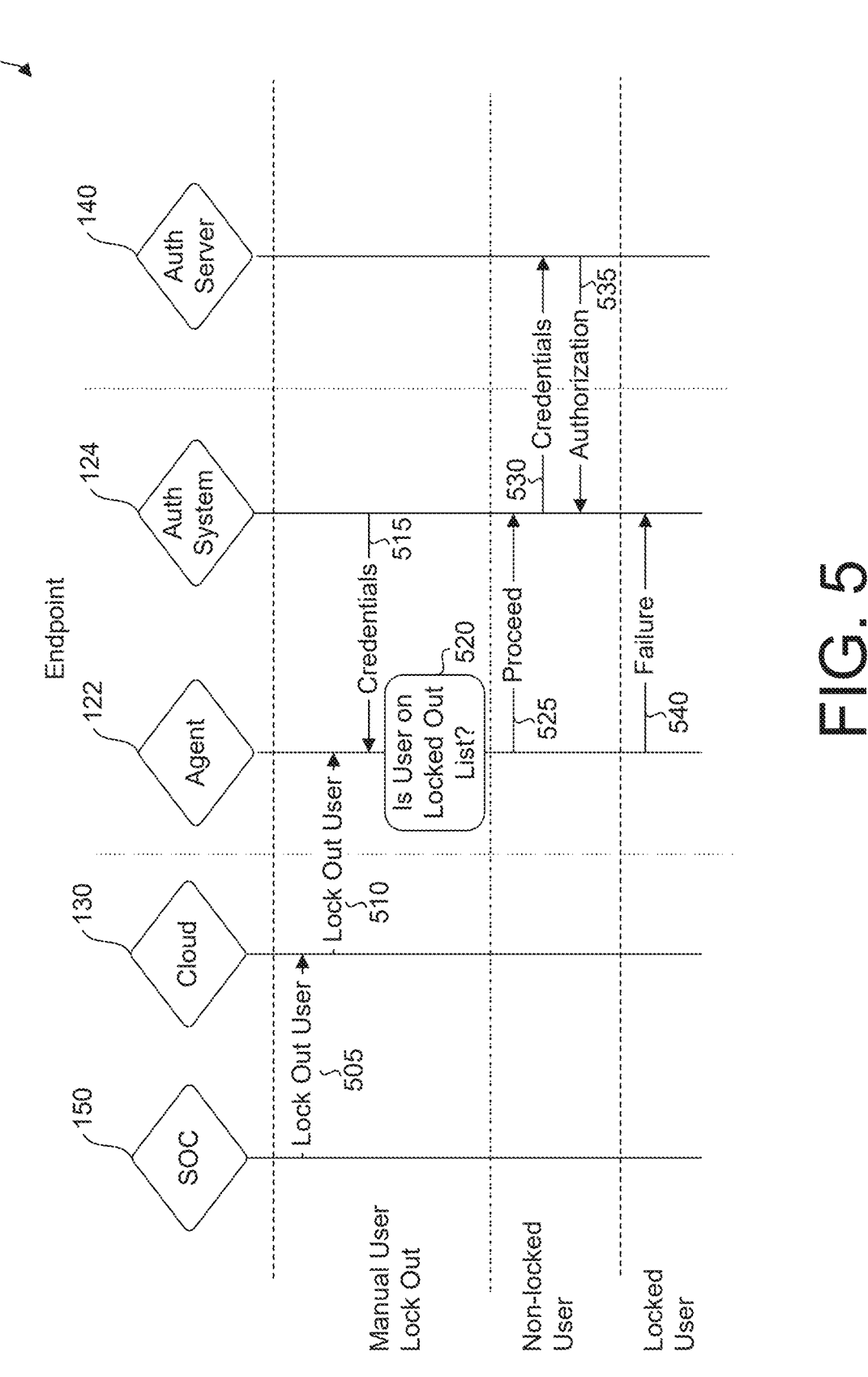
FIG. 5 is a fourth diagram illustrating an authentication workflow.

FIG. 5 is a diagram 500 of a workflow in which the SOC 150, at 505, initiates a manual lock out of user (or users) which results in the monitoring platform 130 sending instructions to the agent 122, at 510, to lock out the user. The authentication system 124, at 515, sends credentials to the agent 122 which, at 520, determines whether the user corresponding to the credentials is on a locked out list. If the user is not locked out, the agent 122, send a message, at 525 to the authentication system 124 to proceed. The authentication system 124 causes, at 530, the credentials to be sent to the authentication server 140 which then returns, at 535, for an authorization for the requestor. If the user is locked out (i.e., on the locked out list), then, at 540, the agent 122 sends a failure message to the authentication system 124 (which then prevents user access to the corresponding resource).

Figure 6:
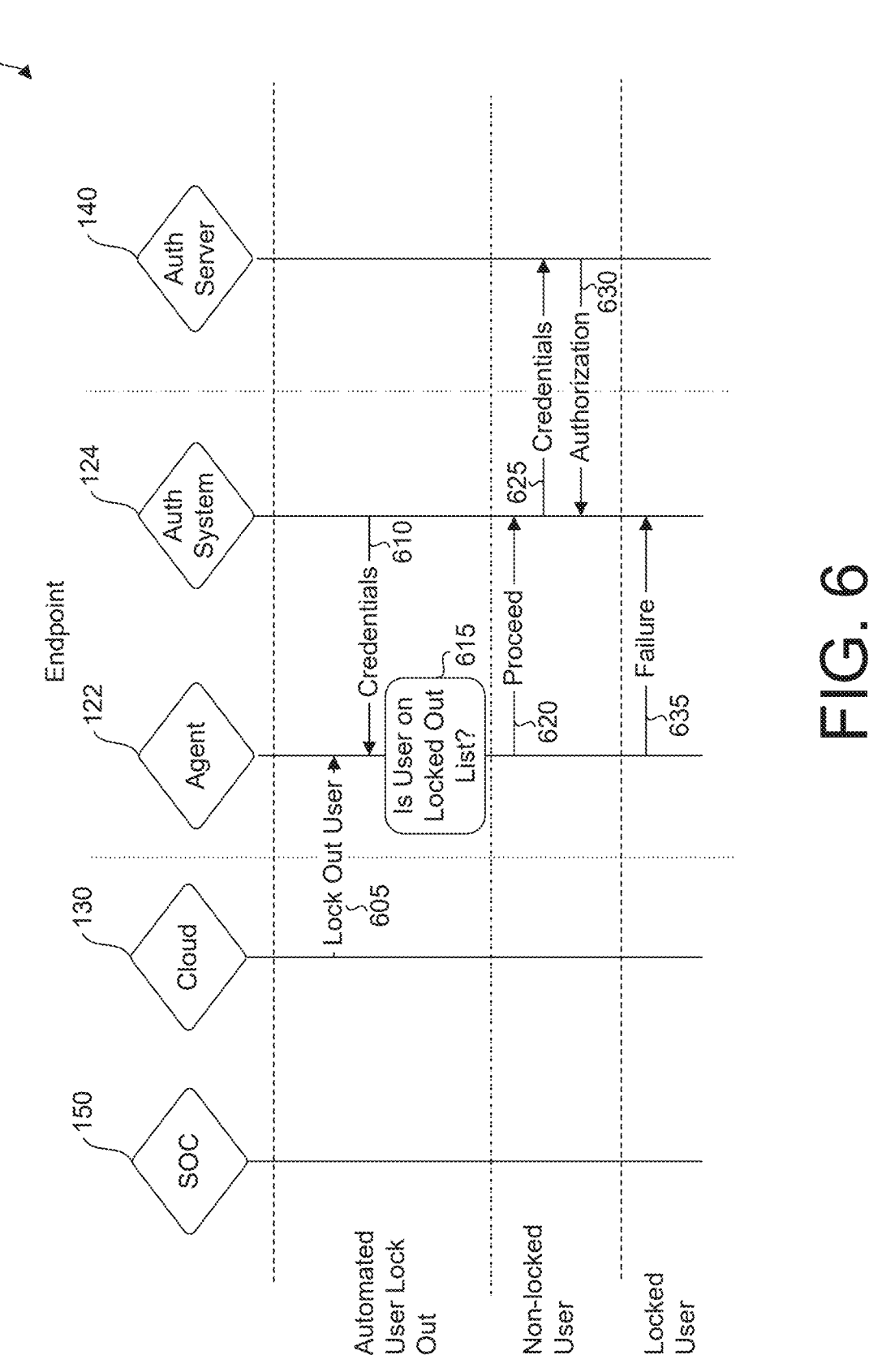
FIG. 6 is a fifth diagram illustrating an authentication workflow.

FIG. 6 is a diagram 600 of a workflow in which the monitoring system 130 automatically, at 605, initiates a lock out of user (or users) by sending instructions to the agent 122 to lock out the user. The authentication system 124, at 610, sends credentials to the agent 122 which, at 615, determines whether the user corresponding to the credentials is on a locked out list. If the user is not locked out, the agent 122, send a message, at 620 to the authentication system 124 to proceed. The authentication system 124 causes, at 625, the credentials to be sent to the authentication server 140 which then returns, at 630, for an authorization for the requestor. If the user is locked out (i.e., on the locked out list), then, at 635, the agent 122 sends a failure message to the authentication system 124 (which then prevents user access to the corresponding resource).

Figure 7:
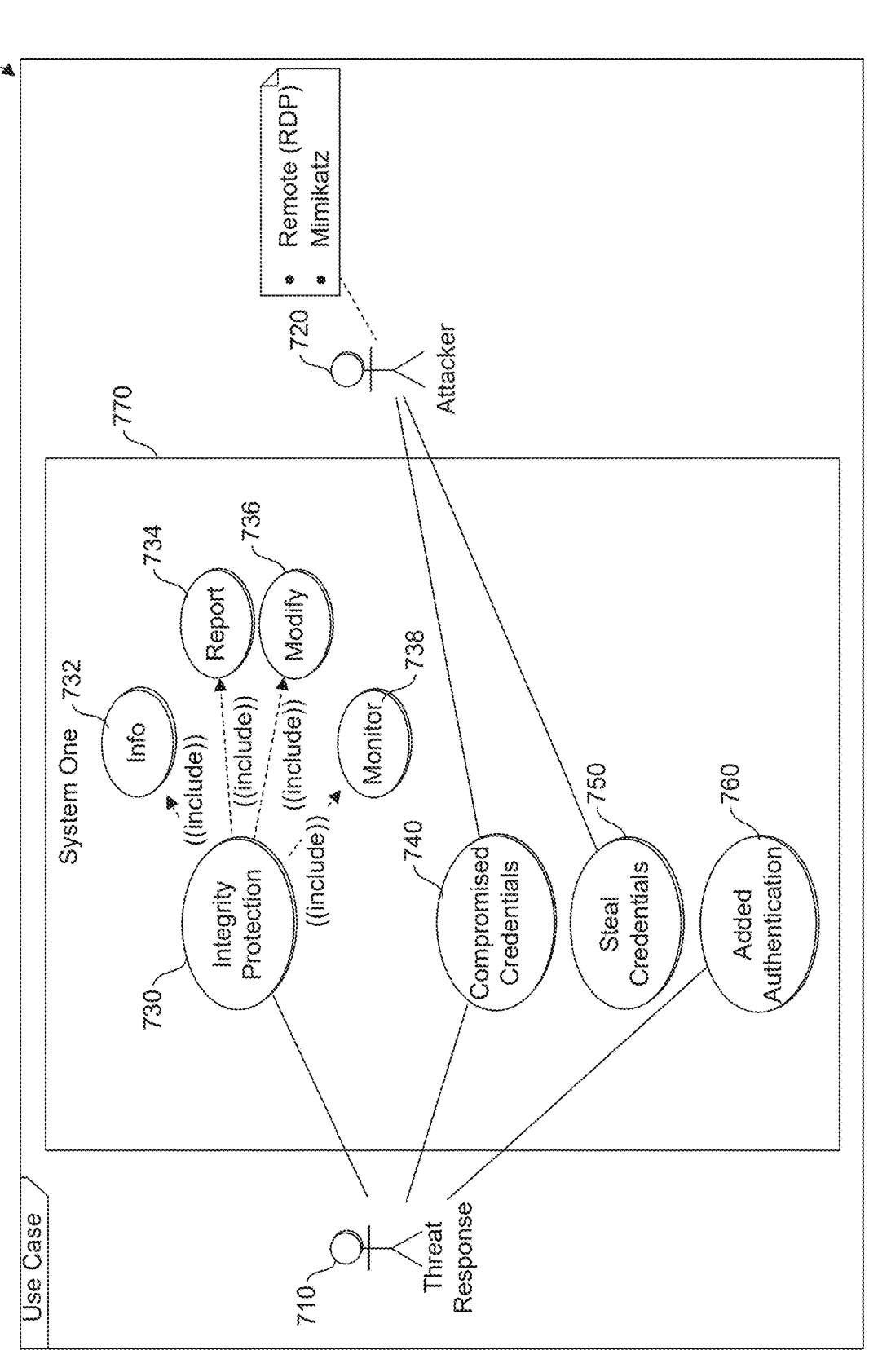
FIG. 7 is a diagram illustrating various interactions between threat response and an attacker.

FIG. 7 is a diagram 700 illustrating various interactions between threat response 710 (e.g., SOC, etc.) and an attacker 720 in relation to a monitored system 770. With the following examples, it will be appreciated that in some variations, the monitoring platform 130 can automatically initiate (using rules, heuristics, models, etc.) the various actions indicated as being initiated by threat response 710. Here, the attacker 720 is able to access credentials 740 or otherwise steal credentials 750 stored in memory of the system 770 through an exploit. An example exploit is Mimikatz which allows the attacker to have remote desktop protocol (RDP) visibility into the system 770. Threat response 710 can initiate on or more integrity protection workflows 730 which obtain information 732 characterizing a user. User information can be reported 734 to SOC 150 (as an example) or the monitoring platform 130, modified 734 by the SOC 150 or the monitoring platform 130 (such as by changing access control groups and/or authentication measures). In addition, the integrity protection workflows 730 can also include enhanced monitoring 738 of certain user This information can subsequently be used to determine whether any authentication measures should be changed (e.g., elevated, etc.). For example, additional layers of authentication and/or more complex authentication measures 760 can be implemented when a ransomware threat is detected.

Figure 8:
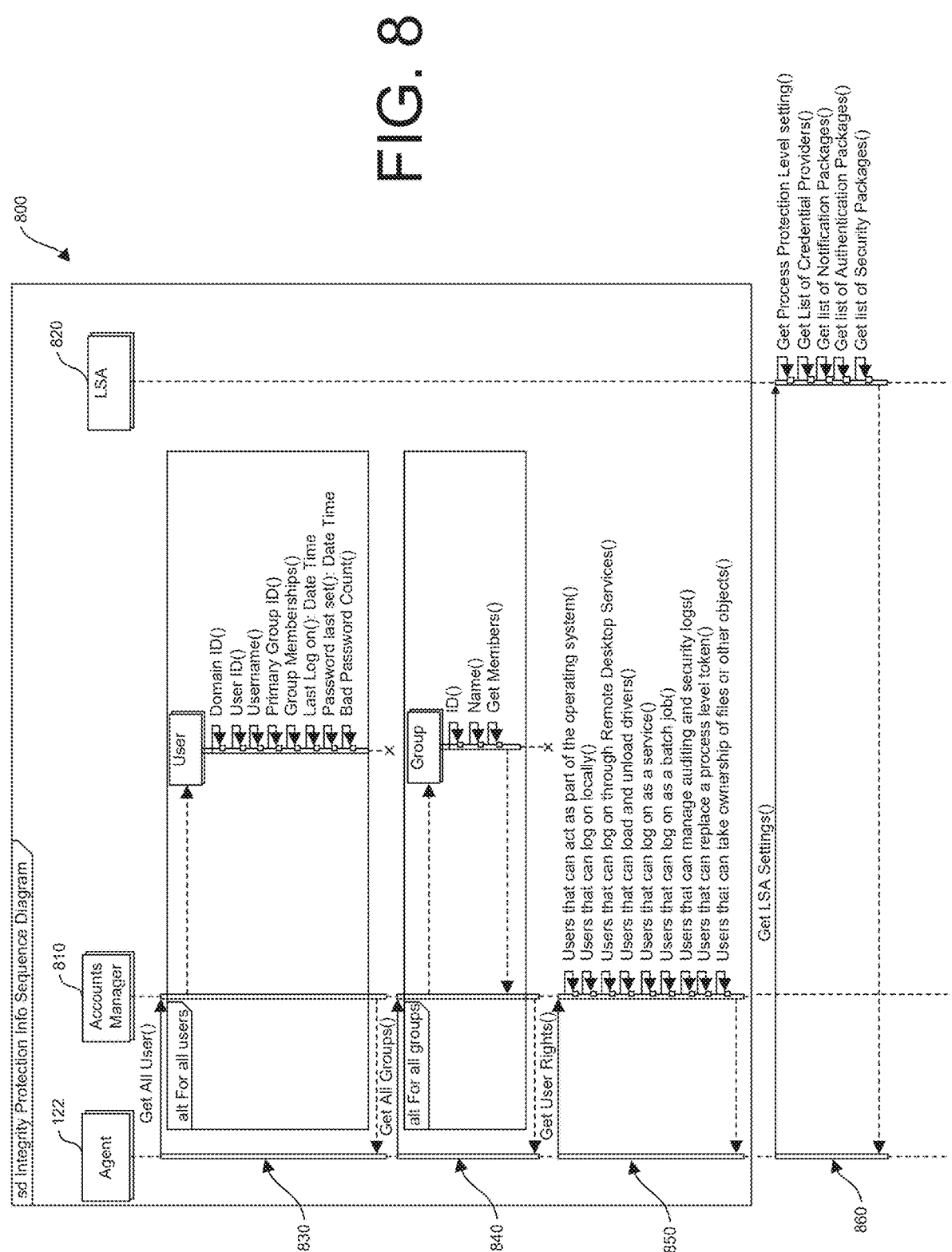
FIG. 8 is a diagram illustrating an integrity protection information sequence.

FIG. 8 is an integrity protection information sequence diagram 800 which can be triggered on-demand, periodically and/or in response to a ransomware or other malicious threat. As noted in FIG. 7, the SOC 710 or the monitoring platform 130 can initiate one or more integrity protection workflows either directly or indirectly. In some cases, the monitoring platform 130 can send a message to the endpoint agent 122 in order to initiate one or more integrity protection workflows. In other cases, the endpoint agent 122 automatically initiates these integrity protection workflows. The endpoint agent 122 can request information about users from one or more of an accounts manager 810 and a Local Security Authority (LSA) 820. The accounts manager 810 take varying forms and characterizes various user accounts for different applications and processes. The accounts manager 810 can include, for example, a local security accounts manager (SAM), an active directory (AD) for a centralized network-wide domain, services such as Azure AD, Entra ID, third party Lightweight Directory Access Protocol applications (LDAPs) and the like. The accounts manager 810 can be local to the monitored computing device 120 or it can be remote. The endpoint agent 122, at 830, can poll the accounts manager 810 to obtain information about all users. User information can take varying forms including domain identifier (ID), user ID, username, primary group ID, group memberships, last log on timestamp, password last set timestamp, bad password count, and the like. The endpoint agent 122, at 840, can poll the accounts manager 810 to get group level information including IDs, group names, and group memberships (i.e., users of the groups). Further, the endpoint agent 122, at 850, can poll the accounts manager 810 to obtain information about user rights. These user rights can take varying forms including and the returned information can identify users with certain access rights including, for example, one or more of: users that can act as part of the operating system, users that can log on locally, users that can log on through RDP, users that can load and unload drivers, users that can log on as a service, users that can log on as a batch job, users that can manage auditing and/or security logs, users that can replace a process level token, users that can take ownership of files or other objects/artifacts, and the like. The endpoint agent, at 860, can poll the LSA 820 in order to get various LSA settings including, one or more of: process protection level settings, credential providers, notification packages, authentication packages, security packages, and the like.

Figure 9:
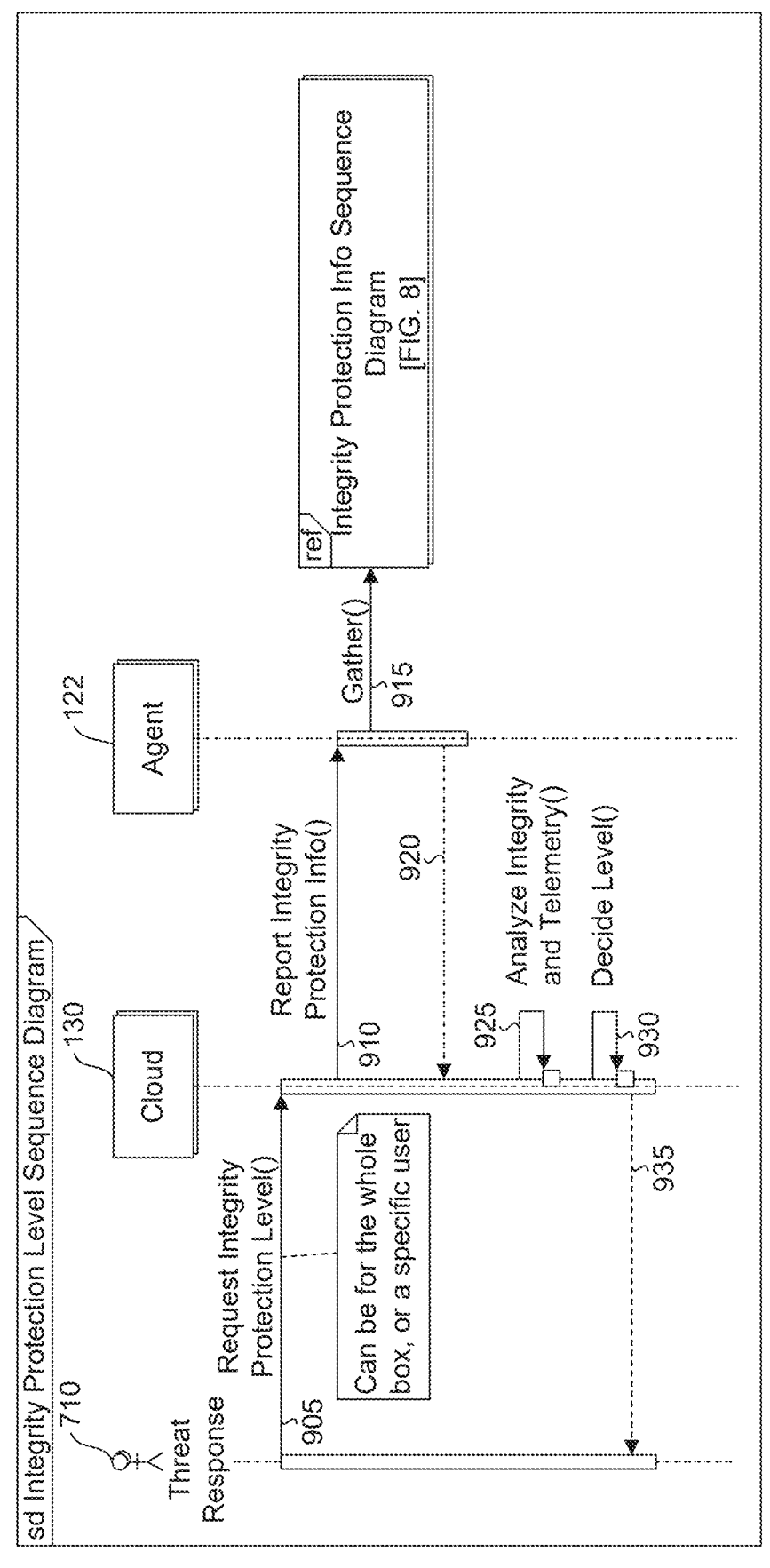
FIG. 9 is a diagram illustrating an integrity protection level sequence.

FIG. 9 is a diagram 900 illustrating a workflow for initiating the integration protection information sequence of FIG. 8. Threat response 710 can, at 905, request integrity protection level to the monitoring platform 130 which then, at 910, relays such request to the endpoint agent 122. The endpoint agent 122, at 915, then gathers that information using, for example, some or all of the sequences in FIG. 8. The endpoint agent 122, at 920, returns the results of the integrity protection information workflows to the monitoring platform 130. The monitoring platform 130, at 925, can analyze the integrity information as well as associated telemetry and, at 930, decide which a threat level and/or an authentication level. This level is conveyed, at 935, by the cloud 130 to threat response 710. The decision, at 930, can characterize the risk level and then determine which authentication levels should be implemented. The risk levels can, as one example, include different categories such as low risk, moderate risk, and high risk. Low risk can relate to a normal operation state in which no added authentication is needed due to expected settings/confirmations or due to a customer-approved security baseline (e.g., settings, configurations, installed applications such as Remote Monitoring and Management (RMM) tools such as ScreenConnect, and the like). A moderate risk categorization can include provide restrictions on certain system/application functionality and the authentication requirements can be elevated (i.e., made more difficult). For example, multi-factor authentication (MFA) can be implemented if there are suspicious telemetry patterns, suspicious installed applications, suspicious uses of applications (e.g., unusual login times, rapid authentication attempts, atypical use of RMM tools, etc.). High risk can be implemented when there are clearly untrusted activities on the computing device 120 or its greater environment. For example, the telemetry and/or integrity data can indicate unapproved changes from baseline settings (e.g., settings, configuration, installed applications). High risk can also be triggered when known ransomware tactics are known (e.g., a user replacing a process level token, or takes actions corresponding to known exploits such as Angry IP, Mimikatz, connecting to Local Security Authority Subsystem Service (lsass), etc.).

Figure 10:
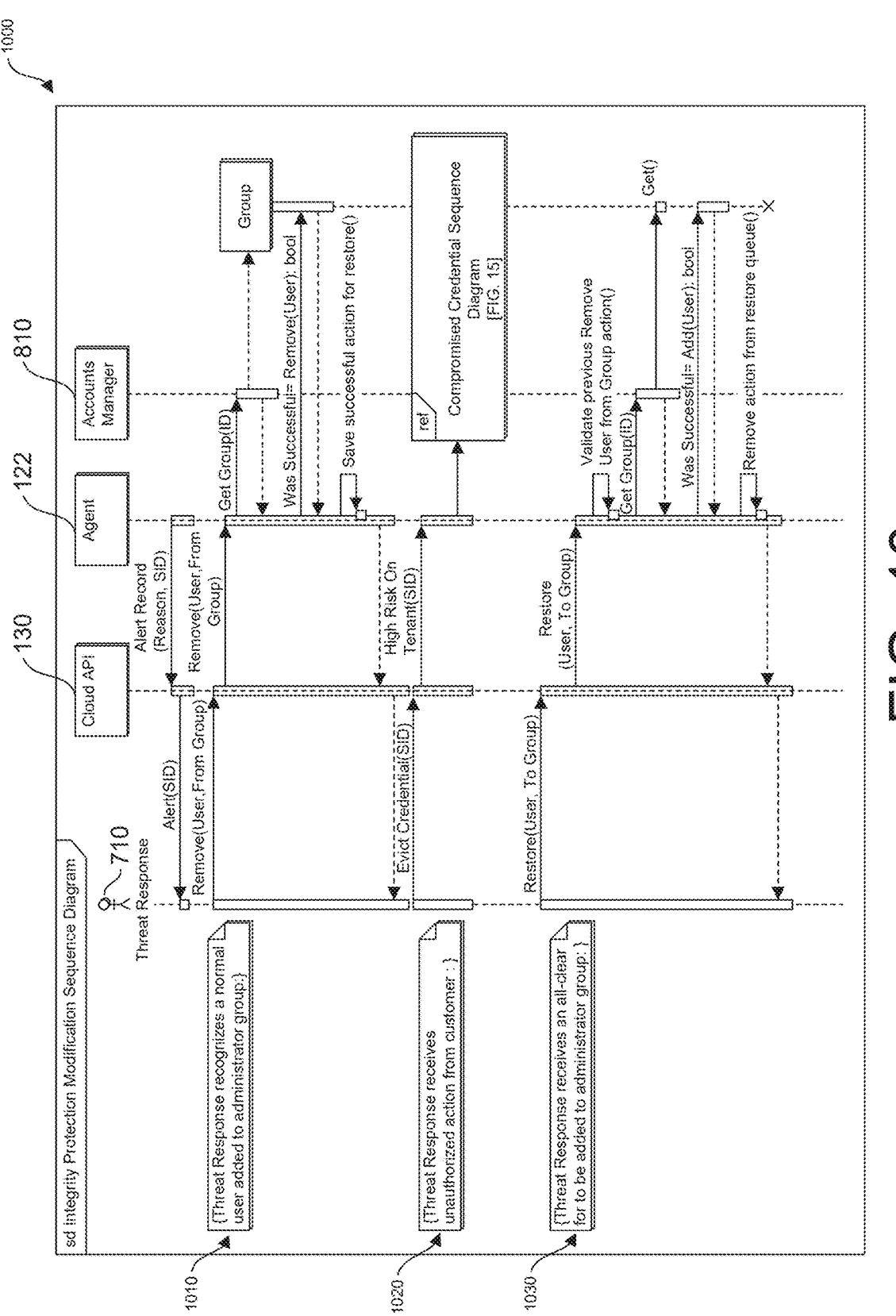
FIG. 10 is a diagram illustrating an integrity protection modification sequence.

FIG. 10 is a diagram 1000 illustrating an integrity protection modification sequence diagram. Threat response 710 can initiate various protective measures in response to an alert or other information. For example, an alert can indicate that a "normal" user was added to an administrator group. In such cases, at 1010, threat response 710 can initiate a workflow 1010 to remove the user from the group which ultimate results in the credential for the added user being evicted. In some cases, threat response 710 receives an alert indicating there is some unauthorized action by a user. In this case, threat response 710 can initiate a workflow 1020 which initiates a comprised credential sequence (as illustrated and described in connection with FIG. 15). In some cases, threat response 710 receives confirmation that a user can be added to an administrator group. In such a case, a workflow 1030 can be initiated in which a user is added to an administrator group or a previously evited user from such group is added. Other workflows can be initiated such as removing or restoring a user right, removing or restoring a LSA setting, and the like.

Figure 11:
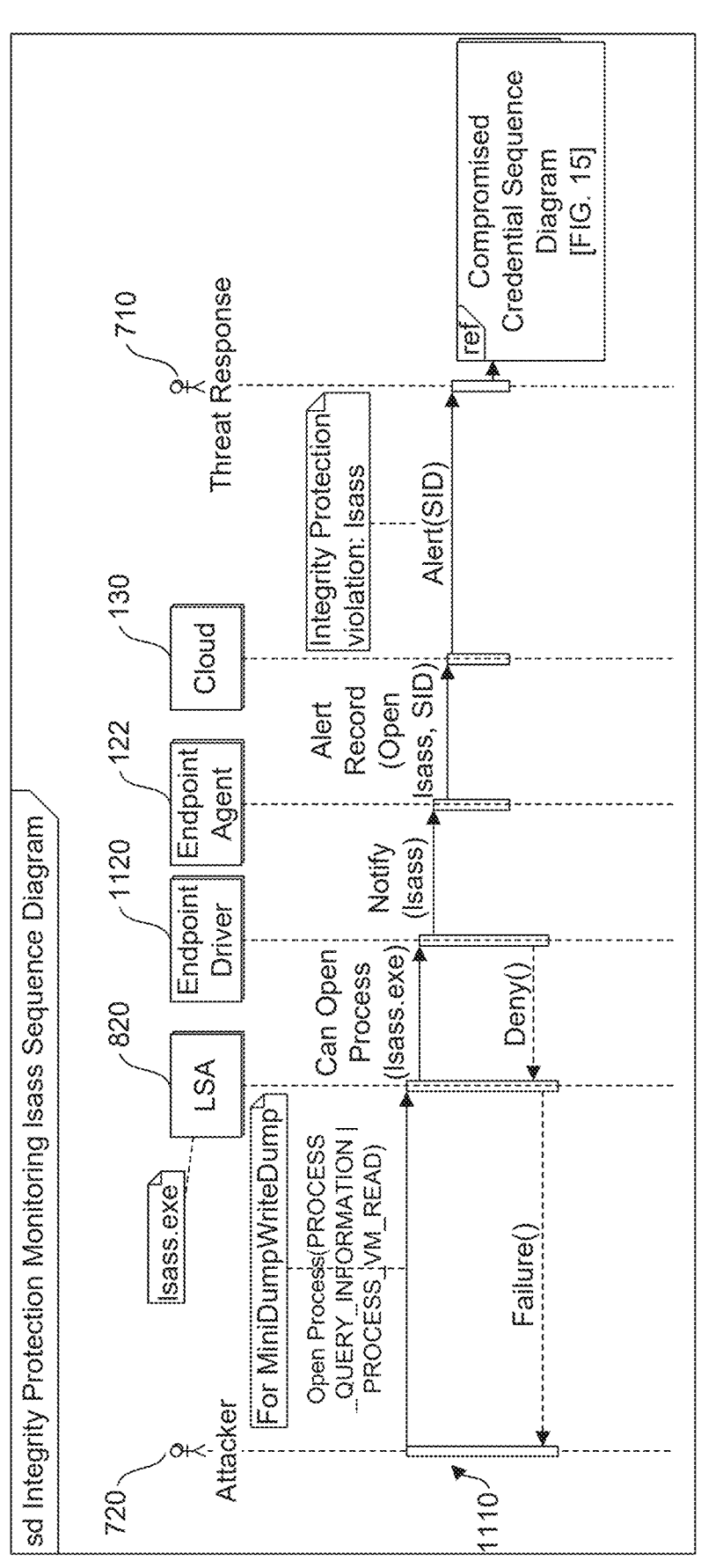
FIG. 11 is a diagram illustrating an integrity protection monitoring lsass sequence.

FIG. 11 is a diagram 1100 illustrating an integrity protection monitoring lsass sequence diagram. Here, an attacker 720 implements an exploit such as Mimikatz which initiates a workflow 1110. In response to the Mimikatz exploit, the LSA 820 sends an alert or notification to an endpoint driver 1120 (i.e., driver being executed on the computing device 120, etc.) indicating that there are issues or events related to lsass. This workflow 1110 includes a notification to threat response 710 which can then trigger a compromised credential sequence (see FIG. 15) which can then result in access for the attacker 720 to be revoked and the like.

Figure 12:
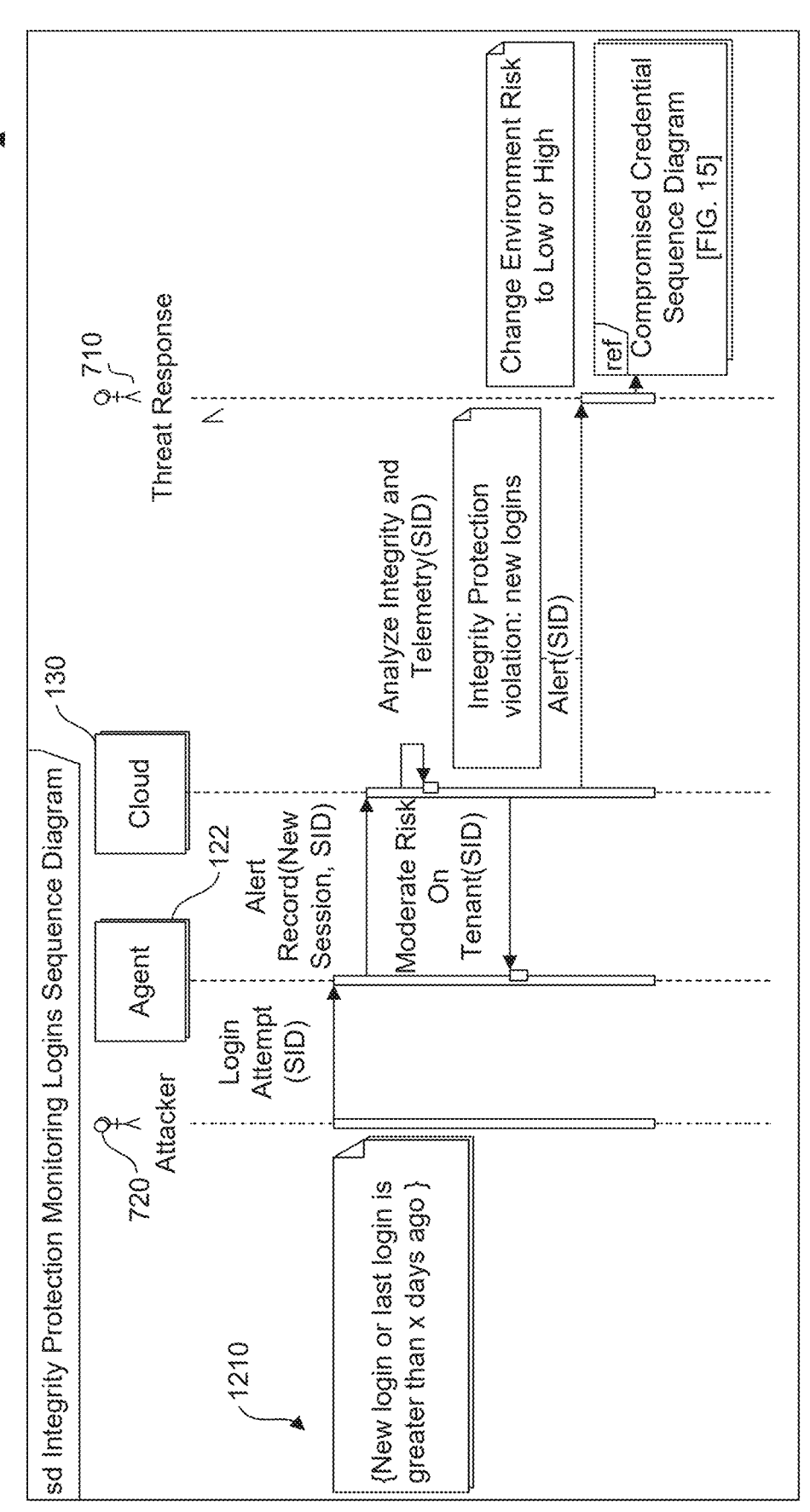
FIG. 12 is a diagram illustrating an integrity protection monitoring logins sequence.

FIG. 12 is a diagram 1200 illustrating an integrity protection monitoring logins sequence diagram. A workflow 1210 can be initiated when there is a new login and/or when the last login was greater than a predefined period of time (e.g., 365 days). With this arrangement, the monitoring platform 130 can determine the anomalous nature of the login while analyzing integrity and telemetry information. For example, the monitoring platform 130 can elevate the risk state when, for example, there are Y (e.g., 5, etc.) or more new logins within Z minutes (e.g., 30 minutes, etc.) for a particular monitored environment (e.g., tenant, etc.). An alert can be sent to threat response 710 which indicating that there are integrity protection violations. Threat response 710 can then initiate the compromised credential sequence (see FIG. 15).

Figure 13:
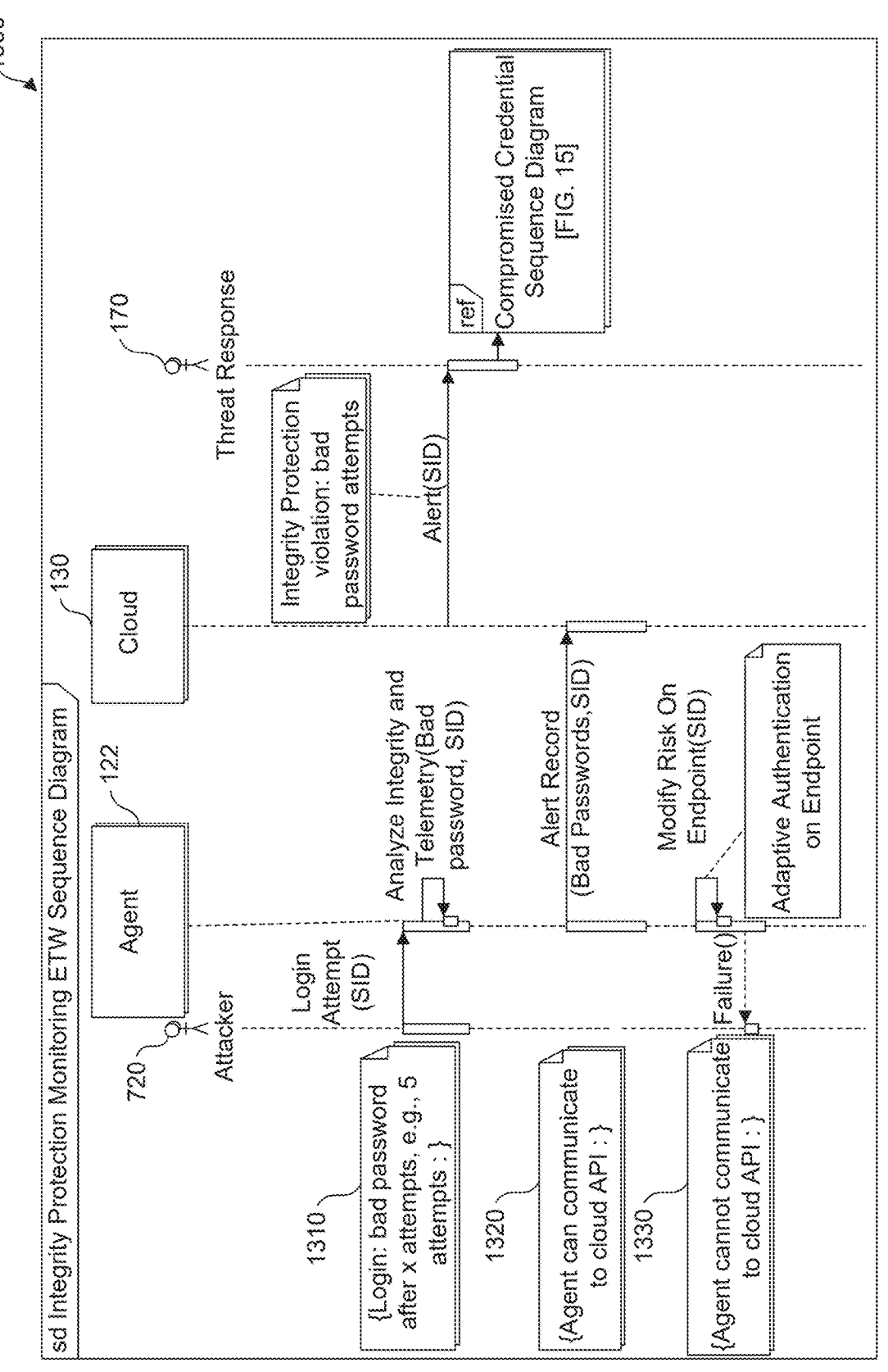
FIG. 13 is a diagram illustrating an integrity protection monitoring event tracing for windows sequence.

FIG. 13 is a diagram 1300 illustrating an integrity protection Event Tracing for Windows (ETW) sequence diagram in which either cloud-based or local remediation actions can be triggered in response to an event such as a series of bad login attempts. In workflow 1310, a login attempt is analyzed by the agent 122 (along with integrity and telemetry data) in order to determine that there was a suspicious login attempt. In workflow 1320, the agent 122 is able to communicate with the monitoring platform 130 so an alert can be sent from the agent to the monitoring platform 130 to allow for remediative actions to be undertaken to help thwart the ransomware attack such as one or more of the adaptive authentication techniques described above. With this workflow 1320, the monitoring platform 130 can consume events from the Microsoft Windows Kernel Registry provider and can optionally filter out messages. For example, LSA events can be filtered RunasPPL, notification packages, authentication packages, and security packages. Further, the monitoring platform 130 can look at events relating to credential provider filters and credential providers, and the like.

In a different workflow 1330, the agent 122 cannot communicate with the monitoring platform 130 due, for example, to infiltration of the ransomware and the resulting cessation of certain processes or applications. In these cases, the agent 122 has to analyze, for example, ETW events generated by the Microsoft Windows Security Auditing provider to determine whether to change the risk level (and thus the authentication requirements). These ETW events can include, for example, a bad password event, a password change event, an add group membership change event, a remove group membership change event, a local policy change event, and/or a user rights assignment change event.

Figure 14:
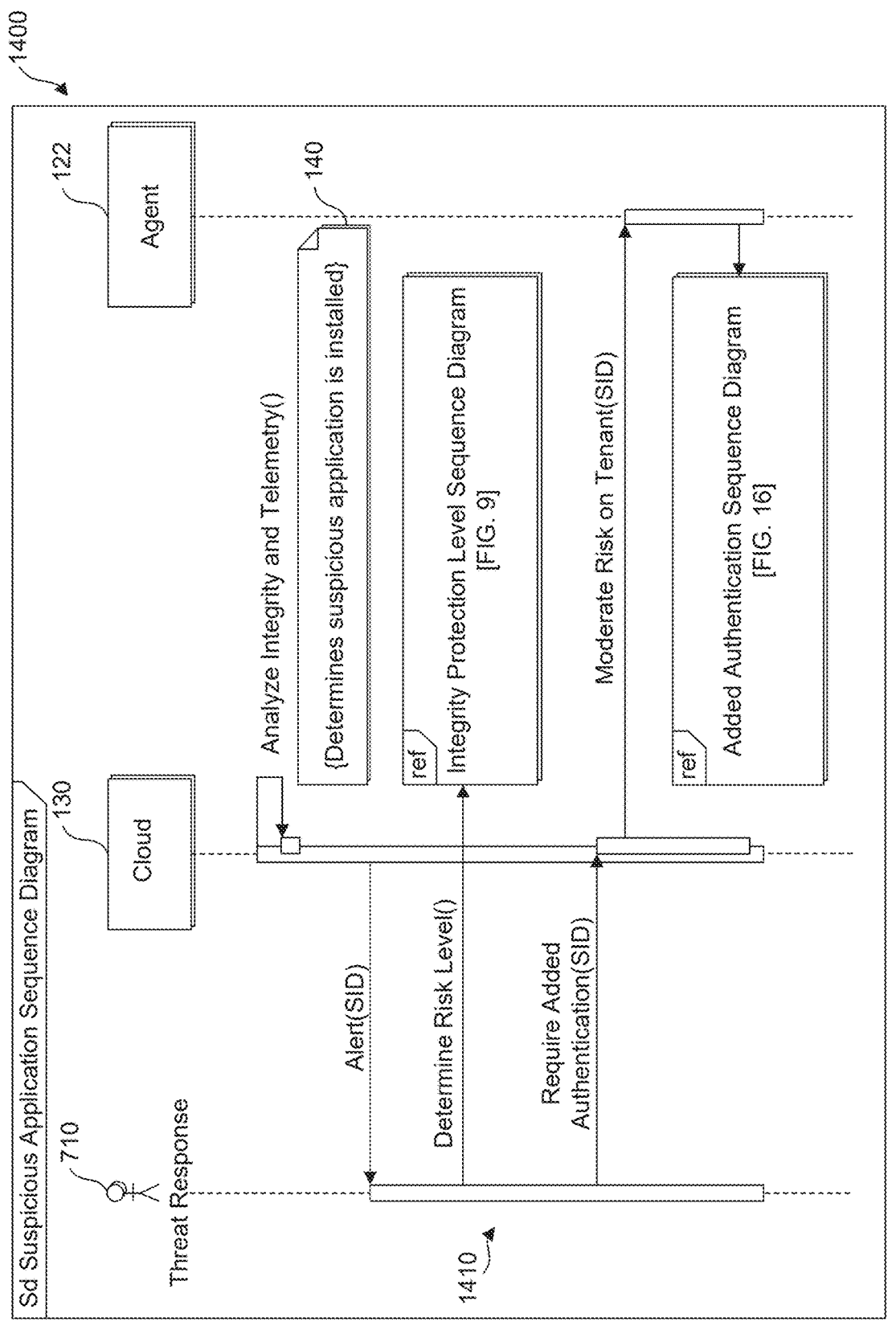
FIG. 14 is a diagram illustrating a suspicious application sequence.

FIG. 14 is a diagram 1400 illustrating a suspicious application sequence diagram in which there is a workflow 1410 in which threat response 710 can initiate escalating the risk level (which can then result in adaptive authentication mechanisms being implemented). The monitoring platform 130 (or alternatively the agent 122) can, based on integrity and telemetry information, determine that a ransomware event has occurred such as suspicious application (e.g., ScreenConnect, etc.) being installed. A corresponding alert can be sent to threat response 710 which then initiates an integrity protection level sequence such as in FIG. 9. Threat response 710 can also instruct the monitoring platform 130 to cause the agent 122 to require added authentication. The agent 122 can initiate an added authentication sequence such as in FIG. 16.

Figure 15:
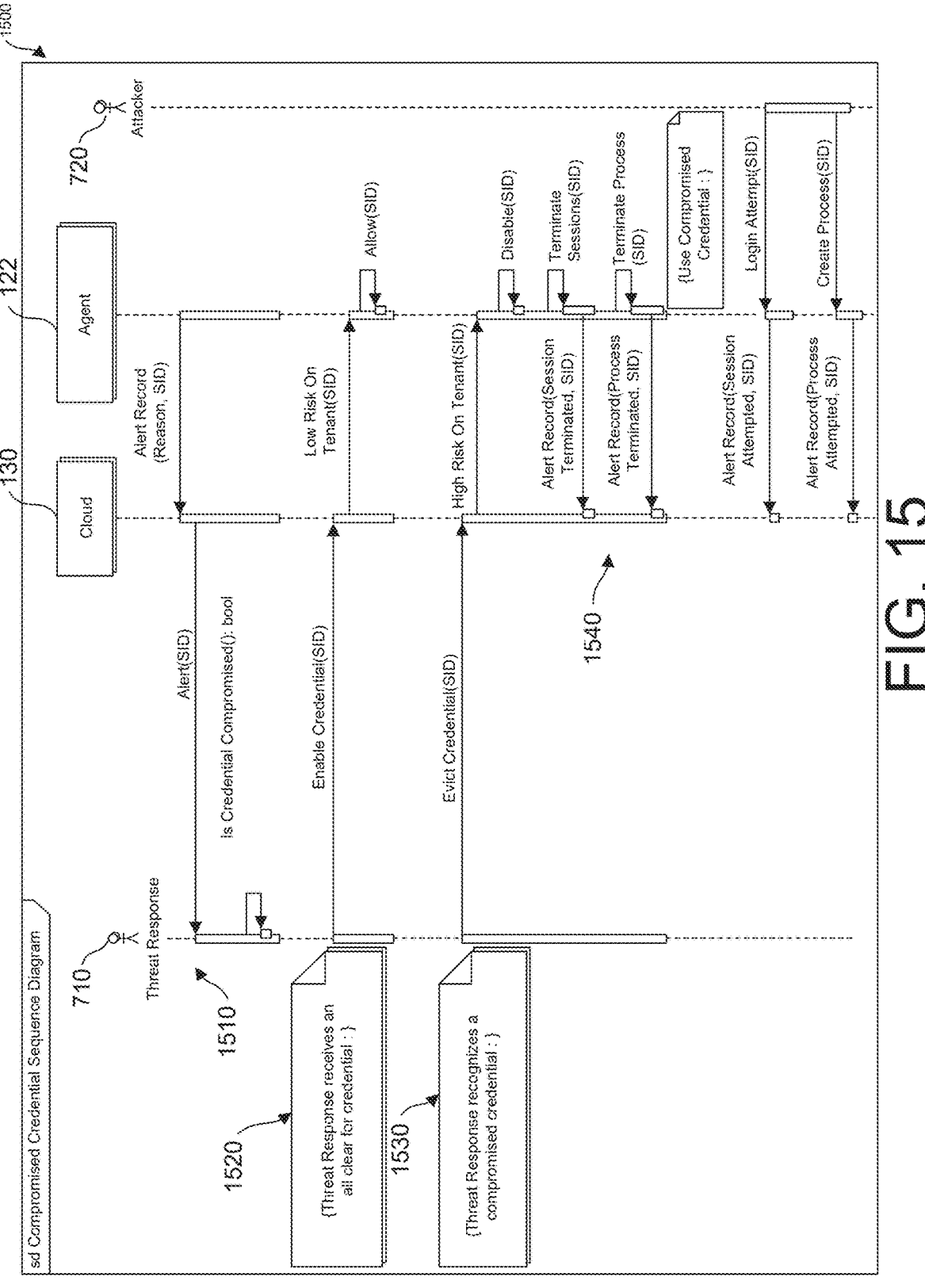
FIG. 15 is a diagram illustrating a compromised credential sequence.

FIG. 15 is a diagram 1500 illustrating a compromise credential sequence diagram. Here, at workflow 1510, the endpoint agent 122 initiates an alert indicating that a credential has potentially been compromised. The endpoint agent 122 and/or the monitoring platform 130 can make such a determination based on a variety of factors such as process block, an integrity protection violation, unusual login attempts and the like. Threat response 710 can initiate a workflow 1520 when an "all clear" has been received for the associated credential indicating that it has not been compromised. In this arrangement, a message can be sent to the monitoring platform 130 to enable the credential on the agent 122. When threat response 710 determines that a credential has been compromised, a workflow 1530 can be initiated in which threat response 710 sends a message to the monitoring platform 130 to cause the agent 122 to evict the credential. Evict can include disabling the credential, terminating any sessions using the credential, and/or terminating any processes using the credential. If there are subsequent use of the compromised credential, a workflow 1540 can be initiated in which session and process information associated with such subsequent use is recorded so that corresponding alerts can be generated (and for example, conveyed to threat response 710).

Figure 16:
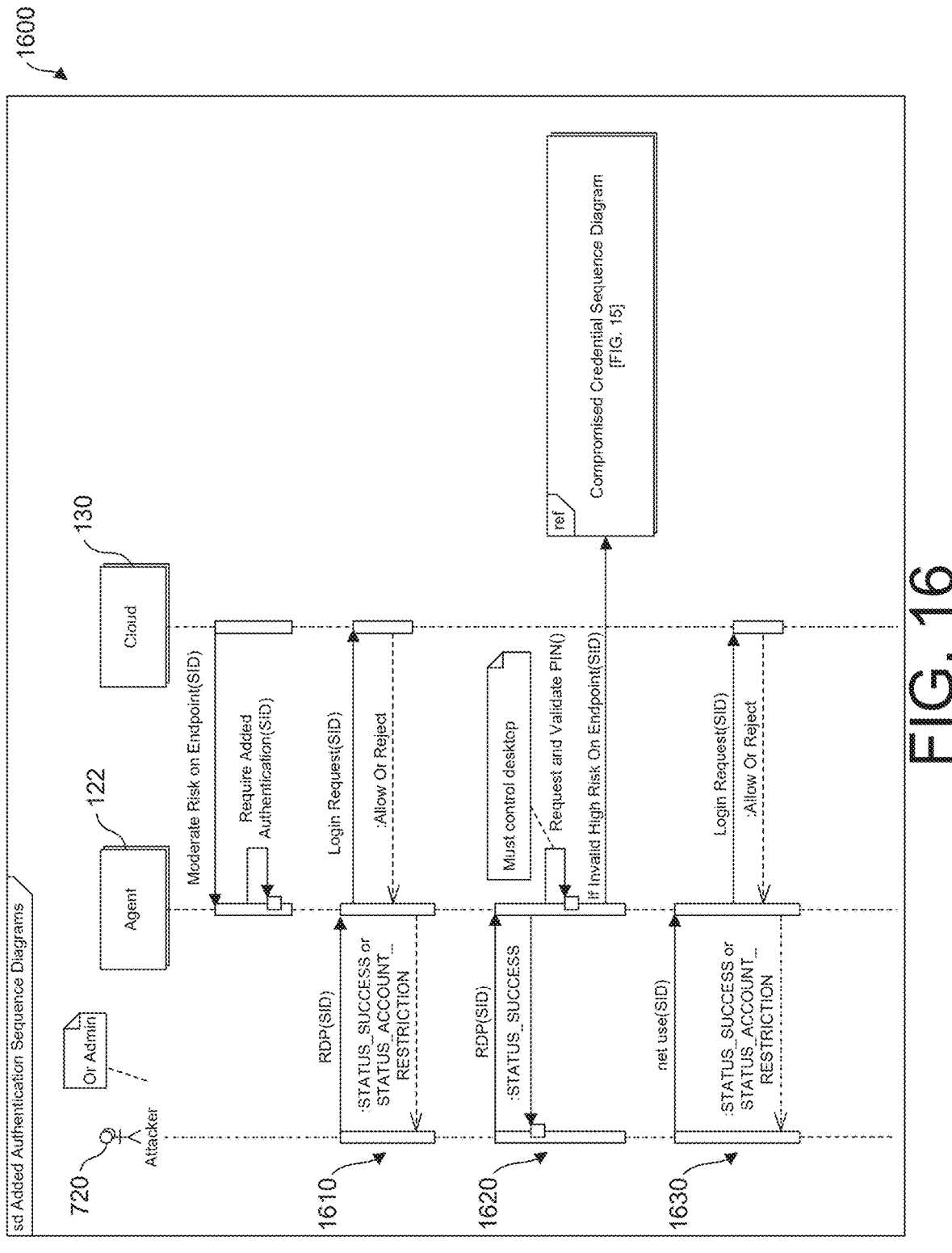
FIG. 16 is a diagram illustrating an added authentication sequence.

FIG. 16 is a diagram 1600 illustrating an added authentication sequence diagram. Here, a determination can be made by the monitoring platform 130 (or alternatively threat response 710 or directly by a customer) that there is risk on the monitored computing device 120. Agent 122 then initiates a processes for added authentication. With workflow 1610, the attacker 720 through RDP seeks access to the monitored computing device 130 by way of the agent 122. This request is either allowed or rejected by the monitoring platform 130. Subsequently, at workflow 1620, if the agent 122 determines that a secondary authentication measure (e.g., PIN to access desktop, etc.) has failed, then the compromised credentials sequence as in FIG. 15 is initiated. In such cases, the agent 122 may no longer be able to communicate with the monitoring platform 130 due to progression of the ransomware attack. With workflow 1630, the agent 122 is still in communication with the monitoring platform 130 so that the monitoring platform 130 can ultimately make the determination (using for example, a subauth function, etc.) as to whether to allow or rejection a login request.

Figure 17:
FIG. 17 is a process flow diagram illustrating a technique for securing a computing environment from unauthorized access.
Figure 17:
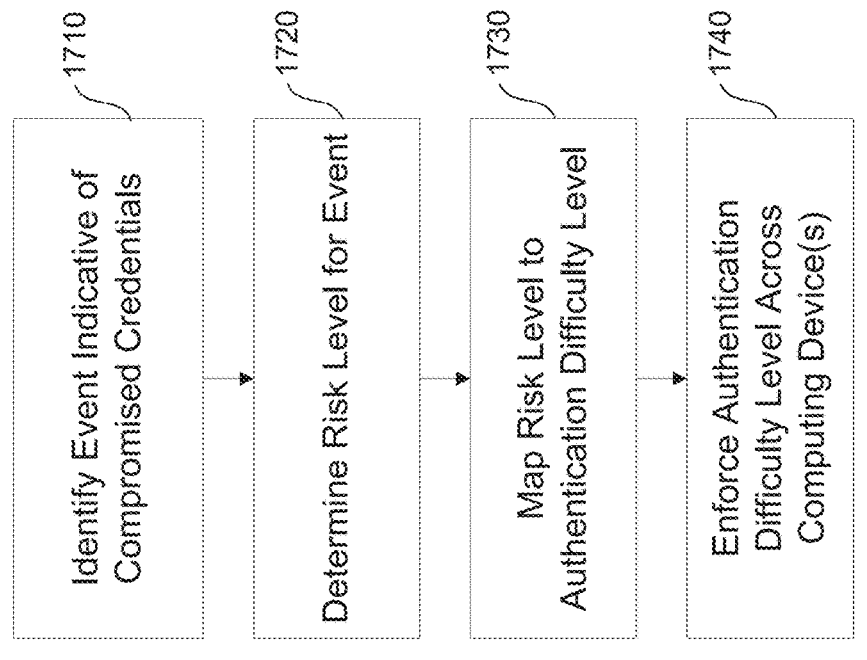

FIG. 17 is a process flow diagram 1700 for securing a computing environment from unauthorized access. An event indicative of compromised credentials are identified, at 1710, based on telemetry data generated by an agent executing on a monitored computing device and user integrity information. A risk level is then, at 1720, determined for the event. The risk level is mapped, at 1730, to an authentication difficulty level. The authentication difficulty level is then, at 1740, enforced across one or more computing devices within the computing environment.

Relatedly, a process for securing a computing environment from unauthorized access is carried out by one or more processors and involves an event that suggests credentials may have been compromised is identified by analyzing telemetry data produced by an agent running on a monitored computing device, along with user integrity information. When such an event is detected, the agent sends information describing the event to a remote ransomware monitoring platform. The agent then receives a risk level for the event from the ransomware monitoring platform, which reflects the likelihood or severity of the credential compromise. This risk level is then mapped by the agent to an authentication difficulty level, specifying the types of authentication mechanisms that should be applied. The agent subsequently enforces the selected authentication difficulty level across one or more computing devices within the environment to address the event indicative of compromised credentials.

Still relatedly, a process for securing a computing environment from unauthorized access is executed by one or more processors and involves the identification of an event that indicates potential credential compromise, based on telemetry data generated by an agent running on a monitored computing device and user integrity information. Upon detection of such an event, the process adaptively increases the authentication difficulty to address the risk associated with the compromised credentials. The elevated authentication difficulty level is then enforced across one or more computing devices within the computing environment to mitigate unauthorized access.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for securing a computing environment from unauthorized access, the method being implemented by one or more processors and comprising:

identifying, based on (i) telemetry data generated by an agent executing on a monitored computing device and (ii) user integrity information, an event indicative of compromised credentials;

determining, based on the identifying, a risk level for the event indicative of compromised credentials;

mapping the risk level to an authentication difficulty level, the authentication difficulty level specifying types of authentication mechanisms to implement;

enforcing the authentication difficulty level across one or more computing devices within the computing environment to counter the event indicative of compromised credentials;

terminating any active sessions associated with the compromised credentials; and in response to subsequent use of the compromised credentials, recording session and process information associated with the subsequent use and generating an alert;

wherein:

the agent locally collects the telemetry data by monitoring operating-system kernel event streams including Event Tracing for Windows (ETW) security auditing events and Local Security Authority (LSA) settings and events;

the telemetry data comprises at least credential provider changes, notification package changes, authentication package changes, and attempted access to a Local Security Authority Subsystem Service (lsass) process; and enforcing the authentication difficulty level comprises, via a pluggable authentication module (PAM) integrated with an endpoint authentication system on the monitored computing device, automatically requiring a token-based multi-factor authentication or denying authentication for accounts associated with the compromised credentials, including when the monitored computing device is unable to communicate with a remote monitoring platform.

2. The method of claim 1 further comprising:

terminating any processes associated with the compromised credentials including processes executing under an impersonated or replaced process-level token.

3. The method of claim 1 further comprising:

generating an alert when the compromised credentials are subsequently used after the enforcement of the authentication difficulty level.

4. The method of claim 1 further comprising:

initiating, by the agent, an integrity protection information sequence to obtain the user integrity information.

5. The method of claim 4, wherein the integrity protection information sequence comprises:

obtaining, by the agent for each of a plurality of users in the computing environment, user identification information, user membership information, login information, and password attempt information.

6. The method of claim 4, wherein the integrity protection information sequence comprises:

obtaining, by the agent for each of a plurality of users in the computing environment, user rights information specifying actions and operations the user is authorized to conduct.

7. The method of claim 4, wherein the integrity protection information sequence comprises:

obtaining, by the agent for each of a plurality of users in the computing environment, local security authority settings.

8. The method of claim 1, wherein the identifying is performed locally by the agent on the computing device.

9. The method of claim 1, wherein the identifying comprises:

transmitting at least a portion of the telemetry data and the user integrity information to a remote monitoring platform; and receiving data from the remote monitoring platform indicating that that there are likely compromised credentials.

10. The method of claim 9 further comprising:

determining, by the remote monitoring platform, which ransomware tools are being utilized as part of a ransomware attack; and examining configuration data associated with the ransomware tools to extract any compromised credentials being utilized as part of the ransomware attack;

wherein the enforced authentication difficulty level is applied to accounts associated with the compromised credentials.

11. The method of claim 1, wherein the telemetry data comprises one or more of: captured login timestamps, login failure counts, login locations, network folder access requests, network file enumeration requests, privileged processes access requests, process security context, or modifications to system settings.

12. The method of claim 1, wherein the authentication difficulty level is enforced for all applications associated with a user, at least a portion of the applications executing on different computing devices.

13. The method of claim 1, wherein the authentication difficulty level is enforced for all applications associated with each of a plurality of users associated with a same access category.

14. The method of claim 1, wherein identifying the event indicative of compromised credentials comprises detecting anomalous use of service accounts by pattern-matching telemetry received from a plurality of endpoint telemetry components across different computing devices to determine whether service-account usage matches ransomware compromise patterns.

15. The method of claim 1, wherein enforcing the authentication difficulty level comprises selectively requiring token-based multi-factor authentication for users having administrative privileges and denying administrative access absent presentation of a valid token following detection of anomalous initial access or network enumeration activity.

16. A system for securing a computing environment from unauthorized access comprising:

at least one processor, memory storing instructions, which executed by the at least one processor, result in operations comprising:

identifying, based on (i) telemetry data generated by an agent executing on a monitored computing device and (ii) user integrity information, an event indicative of compromised credentials;

determining, based on the identifying, a risk level for the event indicative of compromised credentials;

mapping the risk level to an authentication difficulty level, the authentication difficulty level specifying types of authentication mechanisms to implement;

enforcing the authentication difficulty level across one or more computing devices within the computing environment to counter the event indicative of compromised credentials;

terminating any active sessions associated with the compromised credentials; and in response to subsequent use of the compromised credentials, recording session and process information associated with the subsequent use and generating an alert;

wherein:

the agent locally collects the telemetry data by monitoring operating-system kernel event streams including Event Tracing for Windows (ETW) security auditing events and Local Security Authority (LSA) settings and events;

the telemetry data comprises at least credential provider changes, notification package changes, authentication package changes, and attempted access to a Local Security Authority Subsystem Service (lsass) process; and enforcing the authentication difficulty level comprises, via a pluggable authentication module (PAM) integrated with an endpoint authentication system on the monitored computing device, automatically requiring a token-based multi-factor authentication or denying authentication for accounts associated with the compromised credentials, including when the monitored computing device is unable to communicate with a remote monitoring platform.

17. The system of claim 16, wherein the operations further comprise:

terminating any processes associated with the compromised credentials including processes executing under an impersonated or replaced process-level token.

18. The system of claim 16, wherein the operations further comprising:

generating an alert when the compromised credentials are subsequently used after the enforcement of the authentication difficulty level.

19. The system of claim 16, wherein the operations further comprise:

initiating, by the agent, an integrity protection information sequence to obtain the user integrity information.

20. The system of claim 19, wherein the integrity protection information sequence comprises:

obtaining, by the agent for each of a plurality of users in the computing environment, user identification information, user membership information, login information, and password attempt information.

21. The system of claim 19, wherein the integrity protection information sequence comprises:

obtaining, by the agent for each of a plurality of users in the computing environment, user rights information specifying actions and operations the user is authorized to conduct.

22. The system, of claim 19, wherein the integrity protection information sequence comprises:

obtaining, by the agent for each of a plurality of users in the computing environment, local security authority settings.

23. The system of claim 16, wherein the identifying is performed locally by the agent on the computing device.

24. The system of claim 16, wherein the identifying comprises:

transmitting at least a portion of the telemetry data and the user integrity information to a remote monitoring platform; and receiving data from the remote monitoring platform indicating that that there are likely compromised credentials.

25. The system of claim 24, wherein the operations further comprise:

determining, by the remote monitoring platform, which ransomware tools are being utilized as part of a ransomware attack; and examining configuration data associated with the ransomware tools to extract any compromised credentials being utilized as part of the ransomware attack;

wherein the enforced authentication difficulty level is applied to accounts associated with the compromised credentials.

26. The system of claim 16, wherein the telemetry data comprises one or more of:

captured login timestamps, login failure counts, login locations, network folder access requests, network file enumeration requests, privileged processes access requests, process security context, or modifications to system settings.

27. The system of claim 16, wherein the authentication difficulty level is enforced for all applications associated with a user, at least a portion of the applications executing on different computing devices.

28. The system of claim 16, wherein the authentication difficulty level is enforced for all applications associated with each of a plurality of users associated with a same access category.

29. The system of claim 16, wherein enforcing the authentication difficulty level comprises selectively requiring token-based multi-factor authentication for users having administrative privileges and denying administrative access absent presentation of a valid token following detection of anomalous initial access or network enumeration activity.

30. A non-transitory computer-readable medium storing instructions which, when executed by at least one processor, result in operations comprising:

identifying, based on (i) telemetry data generated by an agent executing on a monitored computing device and (ii) user integrity information, an event indicative of compromised credentials;

determining, based on the identifying, a risk level for the event indicative of compromised credentials;

mapping the risk level to an authentication difficulty level, the authentication difficulty level specifying types of authentication mechanisms to implement;

enforcing the authentication difficulty level across one or more computing devices within the computing environment to counter the event indicative of compromised credentials;

terminating any active sessions associated with the compromised credentials; and in response to subsequent use of the compromised credentials, recording session and process information associated with the subsequent use and generating an alert;

wherein:

the agent locally collects the telemetry data by monitoring operating-system kernel event streams including Event Tracing for Windows (ETW) security auditing events and Local Security Authority (LSA) settings and events;

the telemetry data comprises at least credential provider changes, notification package changes, authentication package changes, and attempted access to a Local Security Authority Subsystem Service (lsass) process; and enforcing the authentication difficulty level comprises, via a pluggable authentication module (PAM) integrated with an endpoint authentication system on the monitored computing device, automatically requiring a token-based multi-factor authentication or denying authentication for accounts associated with the compromised credentials, including when the monitored computing device is unable to communicate with a remote monitoring platform.

\* \* \* \* \*